US009495998B2

(12) United States Patent
Asano et al.

(10) Patent No.: US 9,495,998 B2
(45) Date of Patent: *Nov. 15, 2016

(54) INFORMATION RECORDING AND/OR REPRODUCING APPARATUS

(75) Inventors: Tomoyuki Asano, Kanagawa (JP); Yoshitomo Osawa, Kanagawa (JP); Motoki Kato, Kanagawa (JP)

(73) Assignee: Sony Corporation (JP)

( * ) Notice: Subject to any disclaimer, the term of this patent is extended or adjusted under 35 U.S.C. 154(b) by 1204 days.

This patent is subject to a terminal disclaimer.

(21) Appl. No.: 11/647,395

(22) Filed: Dec. 29, 2006

(65) Prior Publication Data

US 2007/0110238 A1    May 17, 2007

Related U.S. Application Data

(63) Continuation of application No. 09/807,703, filed as application No. PCT/JP00/05482 on Aug. 16, 2000, now Pat. No. 7,239,702.

(30) Foreign Application Priority Data

Aug. 20, 1999  (JP) .................................. 11-234368

(51) Int. Cl.
*H04L 29/06* (2006.01)
*G11B 20/00* (2006.01)
(Continued)

(52) U.S. Cl.
CPC ..... *G11B 20/0021* (2013.01); *G11B 20/00086* (2013.01); *G11B 20/00557* (2013.01);
(Continued)

(58) Field of Classification Search
CPC .................... H04N 21/8547; H04N 21/4334; H04N 21/4627; H04N 21/8435; H04N 21/8456; H04N 21/434; H04N 21/4341; H04N 21/4343; H04N 5/85; H04N 5/913; H04N 9/8042; H04N 9/806; G11B 20/00086; G11B 20/00557; G11B 20/00166; G11B 20/00181; G11B 20/00659; G11B 20/00695; G11B 27/22; G11B 27/105; G11B 27/329; G11B 2220/216
USPC .............................................. 726/27
See application file for complete search history.

(56) References Cited

U.S. PATENT DOCUMENTS 5,327,563 A  *  7/1994  Singh .......................... 713/193
5,488,410 A  *  1/1996  Lieberfarb et al. ............. 726/26
(Continued)

FOREIGN PATENT DOCUMENTS

JP    1993-257816    10/1993
JP    1993-266575    10/1993
(Continued)

OTHER PUBLICATIONS

Tektronix Inc., 'A Guide to MPEG Fundamentals and Protocol Analysis (Including DVB and ATSC)', Tektronix Inc., 1997, entire document, http://www.netmcmarine.co.uk/resources/tektronix_guide%20to%20mpeg.pdf.*

(Continued)

*Primary Examiner* — Luu Pham
*Assistant Examiner* — Ronald Baum
(74) *Attorney, Agent, or Firm* — Lerner, David, Littenberg, Krumholz & Mentlik, LLP

(57) ABSTRACT

Contents data that have been enciphered and transmitted are recorded as they are on a recording medium, and the contents key used to encipher these data is enciphered in a way used in this recording system and is recorded on the medium. Moreover, a step is taken to ensure that fine trick plays can be performed. In recording contents data that have been enciphered and transmitted, the contents data themselves are recorded in the enciphered state on the recording medium. However, the contents data are decoded by a contents data decoding circuit 46, and a map file containing necessary management information for reproduction is created by a map file creating circuit 47 and this file is recorded together with the contents data.

16 Claims, 16 Drawing Sheets

(51) Int. Cl.

| | | |
|---|---|---|
| *G11B 27/10* | (2006.01) | |
| *G11B 27/32* | (2006.01) | |
| *H04N 5/783* | (2006.01) | |
| *H04N 5/913* | (2006.01) | |
| *H04N 21/433* | (2011.01) | |
| *H04N 21/4627* | (2011.01) | |
| *H04N 21/845* | (2011.01) | |
| *H04N 5/85* | (2006.01) | |
| *H04N 9/804* | (2006.01) | |

(52) U.S. Cl.
CPC .......... *G11B27/105* (2013.01); *G11B 27/329* (2013.01); *H04N 5/783* (2013.01); *H04N 5/913* (2013.01); *H04N 21/4334* (2013.01); *H04N 21/4627* (2013.01); *H04N 21/8455* (2013.01); *G11B 2220/216* (2013.01); *G11B 2220/2529* (2013.01); *G11B 2220/2562* (2013.01); *G11B 2220/2575* (2013.01); *H04N 5/85* (2013.01); *H04N 9/8042* (2013.01); *H04N 2005/91364* (2013.01)

(56) References Cited

U.S. PATENT DOCUMENTS

| | | | | |
|---|---|---|---|---|
| 5,517,250 | A * | 5/1996 | Hoogenboom et al. | 375/240.27 |
| 5,647,048 | A | 7/1997 | Ting et al. | |
| 5,648,960 | A * | 7/1997 | Sakazaki et al. | 370/498 |
| 5,742,623 | A * | 4/1998 | Nuber et al. | 714/798 |
| 5,754,651 | A | 5/1998 | Blatter et al. | |
| 5,781,633 | A * | 7/1998 | Tribble et al. | 713/167 |
| 5,838,873 | A * | 11/1998 | Blatter et al. | 386/240 |
| 5,841,861 | A * | 11/1998 | Kondo et al. | 705/57 |
| 5,892,848 | A * | 4/1999 | Nishiwaki et al. | 382/232 |
| 5,898,695 | A * | 4/1999 | Fujii et al. | 370/464 |
| 5,905,845 | A * | 5/1999 | Okada et al. | 386/244 |
| 5,936,925 | A * | 8/1999 | Yoshio et al. | 369/30.18 |
| 6,061,449 | A * | 5/2000 | Candelore et al. | 380/28 |
| 6,061,451 | A | 5/2000 | Muratani et al. | |
| 6,085,223 | A * | 7/2000 | Carino, Jr. | G06F 17/30023 707/999.01 |
| 6,170,060 | B1 * | 1/2001 | Mott et al. | 726/29 |
| 6,209,090 | B1 * | 3/2001 | Aisenberg et al. | 713/178 |
| 6,219,322 | B1 | 4/2001 | Kobayashi | |
| 6,240,516 | B1 * | 5/2001 | Vainsencher | 713/190 |
| 6,246,701 | B1 * | 6/2001 | Slattery | 370/503 |
| 6,285,825 | B1 * | 9/2001 | Miwa et al. | 386/248 |
| 6,434,146 | B1 * | 8/2002 | Movshovich et al. | 370/394 |
| 6,490,683 | B1 * | 12/2002 | Yamada | G11B 20/00086 713/176 |
| 6,570,587 | B1 * | 5/2003 | Efrat | G06F 17/30017 707/E17.009 |
| 6,573,907 | B1 * | 6/2003 | Madrane | G06F 17/30787 707/E17.028 |
| 6,587,948 | B1 * | 7/2003 | Inazawa et al. | 713/193 |
| 6,650,710 | B1 * | 11/2003 | Hamery et al. | 375/240.29 |
| 6,788,876 | B1 * | 9/2004 | Gotoh et al. | 386/241 |
| 6,788,882 | B1 * | 9/2004 | Geer et al. | 386/243 |
| 6,813,777 | B1 * | 11/2004 | Weinberger | H04B 7/18508 348/E5.008 |
| 6,823,131 | B2 * | 11/2004 | Abelard et al. | 386/343 |
| 6,829,618 | B1 * | 12/2004 | Abraham et al. | 369/30.09 |
| 6,855,379 | B2 | 2/2005 | Jung et al. | |
| 6,983,371 | B1 * | 1/2006 | Hurtado | G06F 21/10 380/255 |
| 6,993,248 | B1 | 1/2006 | Kato | |
| 7,110,984 | B1 * | 9/2006 | Spagna | G06F 21/10 380/201 |
| 7,236,596 | B2 * | 6/2007 | Prokoski | 380/258 |
| 7,313,315 | B2 * | 12/2007 | Morris et al. | 386/330 |
| 7,356,142 | B1 * | 4/2008 | Downing | 380/201 |
| 7,447,907 | B2 * | 11/2008 | Hart et al. | 713/176 |
| 7,567,748 | B1 * | 7/2009 | Yoo et al. | 386/241 |
| 2001/0024456 | A1 * | 9/2001 | Zaun et al. | 370/535 |

FOREIGN PATENT DOCUMENTS

| | | |
|---|---|---|
| JP | 8-235832 | 9/1996 |
| JP | 1997-115241 | 5/1997 |
| JP | 9288960 | 11/1997 |
| JP | 10-11894 | 1/1998 |
| JP | 1025310 | 1/1998 |
| JP | 1998-283270 | 10/1998 |
| JP | 11-126426 | 5/1999 |
| JP | 11-224461 | 8/1999 |
| JP | 1999-224461 | 8/1999 |
| JP | 2000-209549 | 7/2000 |
| JP | 2000-224543 | 8/2000 |
| WO | WO 97/14147 | 4/1997 |

OTHER PUBLICATIONS

Wowza Media Systems™, 'Wowza Streaming Engine: Configuration Reference', Version: 4.4, © 2007-2016 Wowza Media Systems™, LLC., entire document, http://www.wowza.com/resources/WowzaStreamingEngine_ConfigurationReference.pdf.*

ITU, 'Recommendation ITU-R BT.1852 (Sep. 2009) Conditional-access systems for digital broadcasting [BT Series Broadcasting services (television)]', © ITU 2009, entire document, https://www.itu.int/dms_pubrec/itu-r/rec/bt/R-REC-BT.1852-0-200909-I!!PDF-E.pdf.*

Lenzi, R., "The Interactive-Music WG-DCM Systems for Multimedia Content Distribution Technology Survey," Rigel Engineering, Jul. 2, 2003, entire document available at http://www.interactivemusicnetwork.org/documenti/view_document.php?file_id=361.

Japanese Office Action dated Dec. 1, 2009 corresponding to JP 2001-519438, 2 pages.

Japanese Office Action issued on Dec. 7, 2010, in corresponding Japanese Patent Application JP 2001-519438.

International Search Report for Application No. PCT/JP00/05482 dated Nov. 21, 2000.

* cited by examiner

INFORMATION RECORDING AND/OR REPRODUCING APPARATUS

This is a continuation of application Ser. No. 09/807,703, filed Apr. 17, 2001, now U.S. Pat. No. 7,239,702, the contents of which are incorporated herein by reference. Application Ser. No. 09/807,703 is the U.S. national stage of International Application No. PCT/JP00/05482, filed on Aug. 16, 2000, and claims priority to Japanese Patent Application No. 11-234368, filed on Aug. 20, 1999.

TECHNICAL FIELD

This invention relates to an information recording apparatus, an information reproducing apparatus, an information recording and reproducing apparatus, an information recording method, an information reproducing method, an information recording and reproducing method and a recording medium that enable to transmit and receive data safely.

BACKGROUND ART

In recent years, recording apparatuses and recording media for recording information digitally are spreading. Since, for example, image and music data are recorded and reproduced with no deterioration in these recording apparatuses and recording media, the data can be copied repeatedly with the quality of the data maintained. From the viewpoint of copyright holders, however, there is a risk that the data the copyright of which they hold may be repeatedly and fraudulently copied with their quality maintained and distributed in the market. For this reason, it is necessary on the side of recording apparatuses and recording media to take appropriate measures to prevent copyrighted data from being fraudulently copied.

As a system for such copyright protection, in the minidisc (MD) (trademark) system for example a method called SCMS (Serial Copy Management System) is used. This means information transmitted through a digital interface together with music data. This information shows under which of three types of data the music data contained fall: data for free copy, data copy once allowed or data copy prohibited. Upon receiving music data from the digital interface, a minidisc recorder detects an SCMS, and if it is copy prohibited, the music data are not recorded on the minidisc, and if it is copy once allowed, it is changed into copy prohibited and is recorded together with the music data received, and if it is copy free, it is recorded as it is together with the music data received.

In this way, in the minidisc system, the SCMS is used to prevent any fraudulent copy of copyrighted data.

Another method of preventing fraudulent copies of copyrighted data is a contents scramble system used in the Digital Versatile Disc (DVD) (trademark). In this system, all the copyrighted data on a disc are enciphered and only licensed recording apparatuses are given cipher keys which enable them to decipher and obtain meaningful data. And recording apparatuses are designed to ensure that all the operators observe the operation rules of not making fraudulent copies. In this way, the DVD system prevents copyrighted data from being fraudulently copied.

However, according to the system adopted by the minidisc system, there is a risk that recording apparatuses that do not follow the operating rule of changing the copy once allowed for the SCMS to the copy prohibited and recording the data received may be manufactured illegally.

And although the system used by the DVD system is effective in ROM media, it is not effective in RAM media in which users can record data. This is because even in cases where unauthorized persons cannot decode the encryption, an illegal copy of the whole data on the disc into a new disc can produce a new disc that works on a licensed legitimate recording apparatus.

Therefore, in the Japanese Patent Application 10-25310 (Japanese Patent Application 1999-224461 Laid Open on Aug. 17, 1999), information for identifying individual recording medium (hereinafter referred to as "medium identification information") are inscribed in it, and this information can only be accessed by licensed apparatuses. In other words, the data on each recording medium are enciphered by a medium identification information and a key based on a secret obtained by taking a license, and apparatuses that have not obtained license cannot decode the data that they may have read making such data meaningless. Furthermore, when a license is given to an apparatus, its operation is prescribed so that no fraudulent copy may be made. Unlicensed apparatuses cannot access medium identification information, and since medium identification information varies for each medium, even if a copy may be made by an unlicensed apparatus of all information accessible to it on a new medium, such new medium enables neither unlicensed apparatuses or licensed apparatuses to read information properly.

Meanwhile, the recording apparatus according to the Patent Application includes for example an interface IEEE1394 capable of transmitting and receiving data to and from other apparatuses and may record contents data transmitted from other apparatuses on a recording medium.

In such a case, the contents data may be enciphered and transmitted by means of the Digital Transmission Content Protection Standard developed by Sony, Matsushita, Hitachi, Toshiba and Intel (this standard itself cannot be viewed without obtaining a license, but anybody can obtain a White Paper describing its outline from its licensing organization: Digital Transmission Licensing Administrator (DTLA)). The contents data are enciphered by means of a contents key Kc to be transmitted and the contents key Kc itself is enciphered. Such a safe method is used for transmission to the recording apparatuses. The simplest method for the recording apparatus to record on a recording medium the transmitted data safely, that is, without any fraudulent copy allowed is to record the contents data enciphered and transmitted as they are on the recording medium, and to encipher the contents key used for enciphering these data by means of the method used in this recording system and to record the same on the recording medium.

In this way, all that a recording apparatus must do at the time of recording is to simply receive and record a large volume of contents data, and the whole operation is simplified.

However, by the method described above, the contents data remain enciphered while they are transmitted to a recording apparatus and recorded on a medium, making the reproduction operation inconvenient.

In other words, essentially at the time of reproducing AV contents, in order to perform trick plays (reproduction while performing a quick traverse or a quick return), the format and structure of the contents data must be identified and it is to be decided which data of the recording medium should be read in response thereto.

However, in the method described above, it is impossible to identify which data are recorded in which unit of the recording medium unless the contents data are read out from the recording medium and decoded, and therefore to finely control trick plays.

DISCLOSURE OF THE INVENTION

In view of such past problems, it is an object of the present invention to provide an information recording apparatus, an information reproducing apparatus, an information recording/reproducing apparatus, as well as an information recording method, an information reproducing method and an information recording/reproducing method capable of recording contents information on a recording medium and to finely control trick plays of this contents information.

It is another object of the present invention to provide a recording medium capable of finely controlling trick plays of the contents information recorded.

It is still another object of the present invention to provide an information recording apparatus, an information reproducing apparatus, and an information recording/reproducing apparatus, as well as information recording method, an information reproducing method and an information recording/reproducing method capable of recording contents information enciphered and transmitted as they are on a recording medium, recording information for enciphering this contents information on a recording medium, and finely controlling trick plays.

It is still another object of the present information to provide a recording medium capable of recording enciphered contents information as it is and finely controlling trick plays of this contents information.

In order to achieve these objects, the information recording apparatus according to the present invention includes an inputting means for inputting contents information; a management information creating means for extracting the access positions for said contents information inputted and for creating management information showing one or more access positions for said contents information; and a writing means for writing said contents information inputted and said management information on a recording medium.

In one respect, the information reproducing apparatus according to the present invention includes a reading means for reading contents information and management information showing one or more access positions for said contents information from the recording medium containing said contents information and said management information; and a reading position controlling means for controlling the reading positions of said contents information on said recording medium based on said management information read from said recording medium.

In another respect, the information recording/reproducing apparatus according to the present invention includes an inputting means for inputting contents information; a management information creating means for extracting access positions for said contents information inputted and for creating management information showing one or more access positions for said contents information; a reading means for reading said contents information and said management information from said recording medium; and a reading position controlling means for controlling the reading positions of said contents information on said recording medium.

In another respect, the information recording method according to the present invention includes the steps of inputting contents information; extracting access positions for said contents information inputted; creating management information showing one or more access positions for said contents information; and writing said contents information inputted and said management information on recording medium.

In another respect, the information reproducing method according to the present invention includes the steps of reading said contents information and said management information from a recording medium on which contents information and management information showing one or more access positions for said contents information; and controlling the reading positions of said contents information on said recording medium based on said management information read from said recording medium.

In another respect, the information recording/reproducing method according to the present invention includes the steps of during the recording process, inputting contents information, extracting the access positions for said contents information inputted, creating management information showing one or more access positions for said contents information, and writing said contents information inputted on the recording medium; and during the reproducing process, reading said contents information and said management information from said recording medium, and controlling the reading positions of said contents information on said recording medium.

In another respect, the recording medium according to the present invention includes contents information, and management information extracted from said contents information and showing one or more access positions for this contents information being recorded.

In another respect, the information recording apparatus according to the present invention includes an inputting means for inputting enciphered contents information; a contents information decoding means for decoding said enciphered contents information; a management information creating means for extracting the access positions for said contents information from the contents information obtained by decoding enciphered contents information and for creating management information showing one or more access positions for said contents information; and a recording means for recording said enciphered contents information, information for enciphering said contents information as well as said management information created.

In another respect, the information reproducing apparatus according to the present invention includes a management information reading means for reading said contents information, information for enciphering said contents information and said management information from a recording medium in which enciphered contents information, information for enciphering said contents information and management information showing one or more access positions for said contents information; a reading position controlling means for controlling the reading positions of said enciphered contents information and information for enciphering said contents information; and a decoding means for decoding said enciphered contents information based on information for enciphering said contents information.

In another respect, the information recording/reproducing apparatus according to the present invention includes an inputting means for inputting enciphered contents information; a contents information decoding means for decoding said enciphered contents information; a management information creating means for creating management information showing one or more access positions for said contents information; a recording means for recording said enciphered contents information, information for enciphering said contents information, and said management information created on a recording medium; a management information reading means for reading enciphered contents information, information for enciphering said contents information and management information showing one or more access positions for said contents information from a recording medium on which said enciphered contents information, information for enciphering said contents information and said management information are recorded; a reading position controlling means for controlling the reading positions for said enciphered contents information on said recording medium and information for enciphering said contents information based on the management information read from said recording medium; and a decoding means for decoding said enciphered contents information based on the information for enciphering said contents information.

In another respect, the information recording method according to the present invention includes the steps of inputting enciphered contents information; decoding said enciphered contents information; extracting the access positions for contents information from said contents information obtained by decoding enciphered contents information; creating management information showing one or more access positions for said contents information; and recording said enciphered contents information, information for enciphering said contents information and said management information created on the recording medium.

In another respect, the information reproducing method according to the present invention includes the steps of reading enciphered contents information, information for enciphering said contents information and management information showing one or more access positions for said contents information from a recording medium containing said enciphered contents information, information for enciphering said contents information and said management information; controlling the reading positions for said enciphered contents information on said recording medium and information for enciphering said contents information; and decoding said enciphered contents information based on the information for enciphering said contents information.

In another respect, the information recording/reproducing method according to the present invention includes the steps of, during the recording process, inputting enciphered contents information, decoding said enciphered contents information, extracting the access positions for contents information from said contents information obtained by decoding enciphered contents information, creating management information showing one or more access positions for said contents information, and recording said enciphered contents information and information for enciphering said contents information as well as said management information created; and during the reproducing process, reading enciphered contents information, information for enciphering said contents information and management information showing one or more access positions for said contents information from a recording medium in which said enciphered contents information, information for enciphering said contents information and said management information are recorded; controlling the reading positions for said enciphered contents information and information for enciphering said contents information on said recording medium based on the management information read from said recording medium; and decoding said enciphered contents information based on information for enciphering said contents information.

In another respect, the recording medium according to the present invention serve to record enciphered contents information, information for enciphering said contents information, and management information extracted from said contents information and showing one or more access positions for said contents information.

BEST MODE FOR CARRYING OUT THE INVENTION

The best mode for carrying out the invention is hereinafter explained with reference to the drawings.

Figure 1:
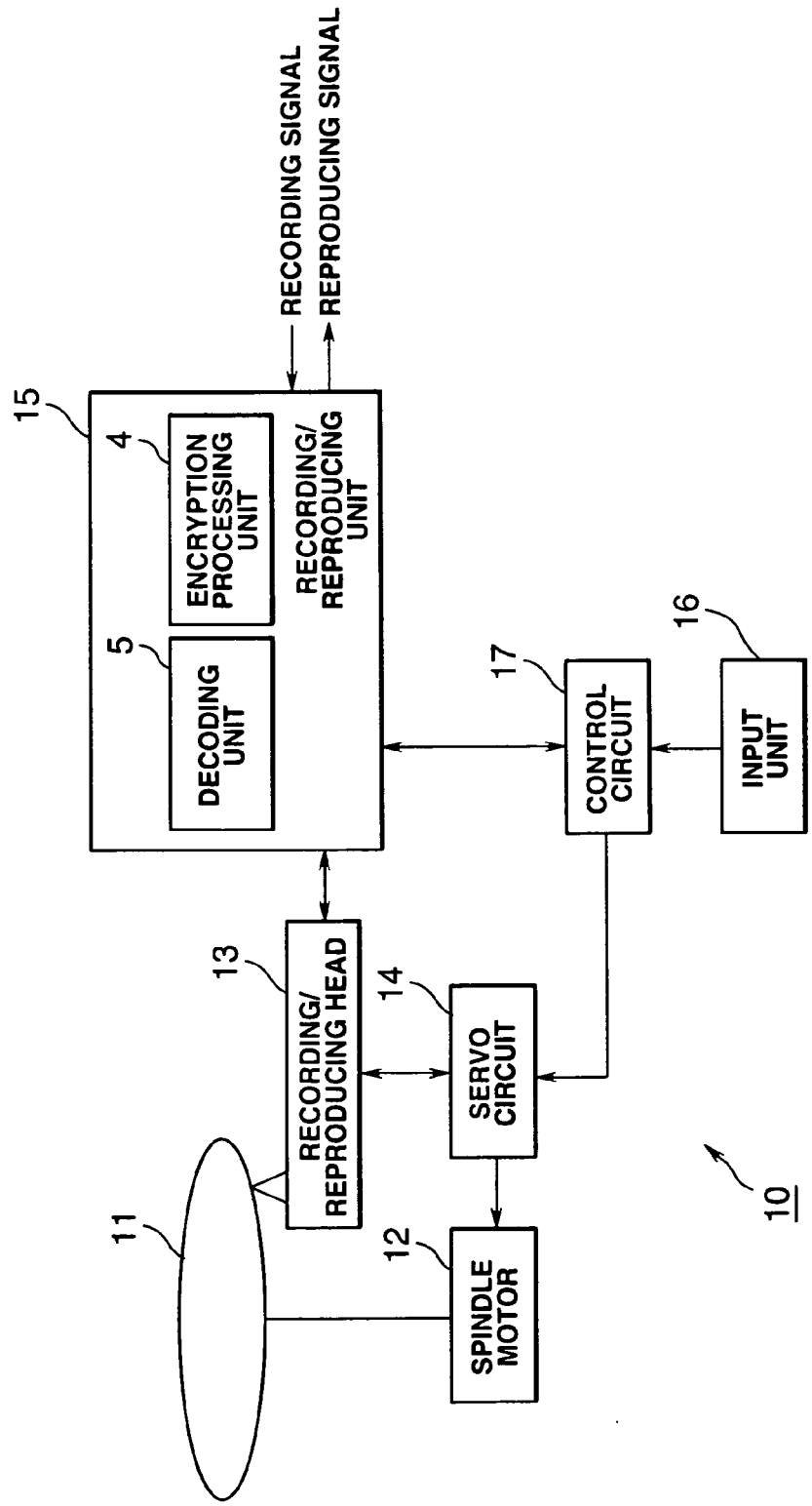
FIG. 1 is a block diagram showing the configuration of an optical disc recording/reproducing apparatus according to the present invention.

This invention is applied, for example, to an optical disc recording/reproducing apparatus 10 configured as shown in FIG. 1.

The optical disc recording/reproducing apparatus 10 shown in this FIG. 1 includes a spindle motor 12 for rotationally driving an optical disc 11, a recording/reproducing head 13 for optically scanning the information recording surface of the optical disc 11, a servo circuit 14 for controlling the spindle motor 12 based on reproduction signals obtained from the recording/reproducing head 13, a recording/reproducing unit 15 for recording/reproducing data through the optical disc 11 by means of the recording/reproducing head 13, and a control circuit 17 for controlling the servo circuit 14 and the recording/reproducing unit 15 based on setting information inputted from the input operating unit 16.

The spindle motor 12 rotationally drives the optical disc 11 at a constant linear velocity based on the control of the servo circuit 14.

The recording/reproducing head 13 optically scans the information recording surface of the optical disc 11 rotationally driven by the spindle motor 12 to record/reproduce data.

The servo circuit 14 drives the spindle motor 12 so that the optical disc 11 may spin at a pre-set speed (for example at a constant linear velocity) and at the same time controls the tracking, focusing and threading of the recording/reproducing head 13.

The recording/reproducing unit 15 includes an encryption processing unit 4 and a decoding processing unit 5 operating under the control of the control circuit 17. The encryption processing unit 4 enciphers recording signals supplied from the outside, supplies enciphered recording signals to the recording/reproducing head 13 so that the same may be recorded on the optical disc 11. And the decoding processing unit 5 decodes the reproduced data that have been reproduced from the optical disc 11 by the recording/reproducing head 13 and outputs the same as reproduced signals to the outside.

The input operating unit 16 includes operation buttons not shown in figure, switches, remote controllers and so forth, and outputs signals corresponding to inputs operated by the user.

The control circuit 17 controls the whole apparatus according to a pre-set computer program stored in a memory not shown in figure.

Figure 2:
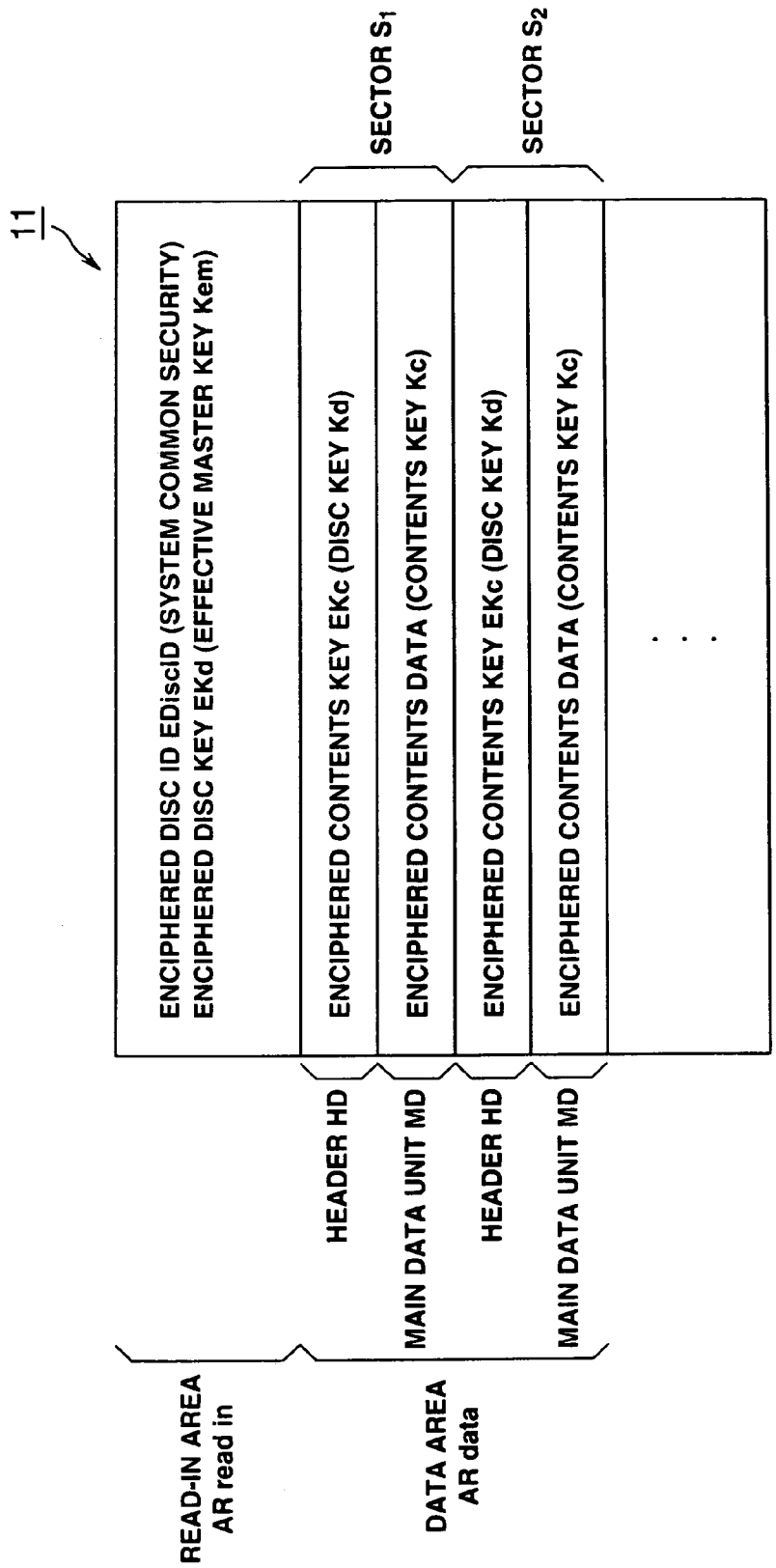
FIG. 2 is a drawing showing the overall configuration of data recorded in the optical disc.

In this mode of carrying out, the optical disc 11 includes, as shown in FIG. 2, a read-in-area AR read in and a data area AR data.

And in the read-in-area AR read in of the optical disc 11, E DiscID obtained by converting the identification information of the recording medium (hereinafter referred to for the sake of convenience as "DiscID") by a previously prescribed common method in the recording system (hereinafter referred to for the sake of convenience as "enciphered by a common security of the system") and an enciphered disc key EKd that has been obtained by enciphering a disc key Kd used for enciphering contents data given to each disc by an effective master key Kem created according to the medium identification information DiscID allocated to the disc are recorded.

Incidentally, the method for converting medium identification information DiscID, i.e. the common security for the system is given by the copyright holder or a license manager approved by the copyright holder (for example, a licensor of recording media format) to licensees together with the master key Km described below at the time when a license is granted properly.

For example, one of the methods for converting medium identification information DiscID is to convert the medium identification information DiscID to information obtained by the time lag at the edge of bits representing the optical disc information by recording the same based on the pre-set M series codes. When such a conversion method is used, the recording of the medium identification information DiscID based on the pre-set M series codes and the M series codes become the common securities for the system. For this reason, it will be impossible to read (decode) the medium identification information DiscID unless both of them are known.

The encryption art based on such M series codes was already proposed by the present applicant in the Japanese Patent Application 9-288960 (corresponding U.S. patent application Ser. No. 09/174,954: filed on Oct. 9, 1998 to the U.S. Patent and Trademark Office). Incidentally, this pre-set common security for the system is given to the licensee together with the master key Km described below when a proper license is granted by the copyright holder.

The effective master key Kem is calculated according to the formula (1) by applying a hash function to the combination of the master key Km and the DiscID.

$$Kem = \text{hash}(Km + \text{DiscID}) \qquad (1)$$

Here, the master key Km is a secret key given only to persons (optical disc recording/reproducing apparatus) properly licensed by the copyright holder. In addition, the combination of A and B, when each of them consists of 32 bits, means combining B after A to make 64-bit data.

And each sector Si (i=1, 2, . . . ) constituting the data area AR data of the optical disc 11 consists of a header HD and a main data unit MD. The header HD stores a ciphered contents key EKc obtained by enciphering the contents key Kc used for enciphering contents data by the disc key Kd (the i of Si here means the number of the sector, but the i is omitted when it is unnecessary to distinguish individual sectors). The main data unit MD stores ciphered contents data obtained by enciphering contents data by the contents key Kc and received by the recording apparatus.

Figure 3:
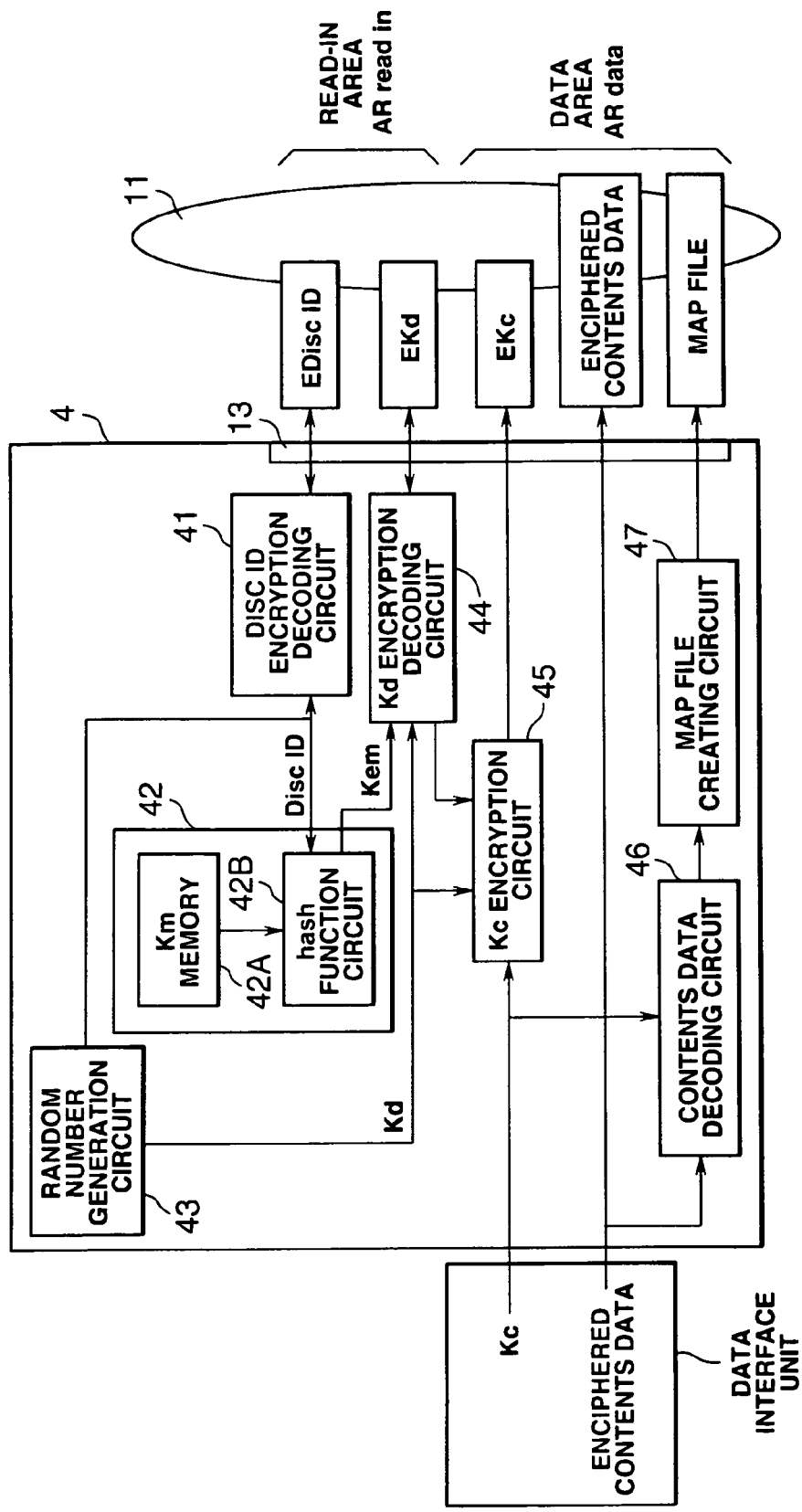
FIG. 3 is a block diagram showing the specific configuration of the encryption processing unit in the optical disc recording/reproducing apparatus.

The encryption processing unit 4 in the optical disc recording/reproducing apparatus 10 of which the concrete configuration is shown in FIG. 3 includes a DiscID encryption decoding circuit 41, a Kem generating module 42, a random number generating circuit 43, a Kd encryption decoding circuit 44, a Kc encryption circuit 45, a contents data decoding circuit 46, and a map file creating circuit 47.

The DiscID encryption decoding circuit 41 decodes E DiscID read from the read-in-area AR read in of the optical disc 11 by means of the recording/reproducing head 13 based on the common security of the system kept in the DiscID encryption decoding circuit 41 and creates medium identification information DiscID. And this DiscID encryption decoding circuit 41 receives random numbers generated by the random number generating circuit 43 as medium identification information DiscID, enciphers the same based on the common security of the system as described above to create EDiscID. The EDiscID created from the random numbers by this DiscID encryption decoding circuit 41 are recorded in the read-in-area AR read in of the optical disc 11 through the recording/reproducing head 13.

The Kem generating module 42 includes a Km memory 42A for storing a master key Km and a hash function circuit 42B for creating effective master keys Kem based on the master key Km and medium identification information DiscID. The hash function circuit 42B generates the combination of the master key Km and a DiscID according to the formula (1), and applies the hash function to the same to create an effective master key Kem. And the hash function circuit 42B supplies the created effective master key Kem to the Kd encryption decoding circuit 44.

The Kd encryption decoding circuit 44 decodes by means of the effective master key Kem the enciphered disc key EKd read from the read-in-area AR read in of the optical disc 11 by the recording/reproducing 13 to create a disc key Kd. And this Kd enciphered decoding circuit 44 receives random numbers generated by the random number generating circuit 43 as a disc key Kd, enciphers the same by means of the effective master key Kem to create an enciphered disc key EKd. The enciphered disc key EKd created by this Kd encryption decoding circuit 44 is stored in the read-in-area AR read in of the optical disc 11 through the recording/reproducing head 13.

The Kc encryption circuit 45 enciphers contents keys Kc that has been received from the interface with other apparatuses by means of the disc key Kd to create enciphered contents keys EKc. The enciphered contents keys EKc created by the Kc encryption circuit 45 are stored in the data area AR data of the optical disc 11 through the recording/reproducing head 13.

The enciphered contents data delivered by the interface unit are stored as they are in the data area AR data of the optical disc 11 through the recording/reproducing head 13.

The contents data decoding circuit 46 decodes contents data by means of the contents key Kc and supplies the same to the map file creating circuit 47.

The map file creating circuit 47 creates map files containing necessary information at the time of reproduction from the decoded contents data. The map files created by this map file creating circuit 47 are stored in the data area AR data of the optical disc 11 through the recording/reproducing head 13.

Figure 4:
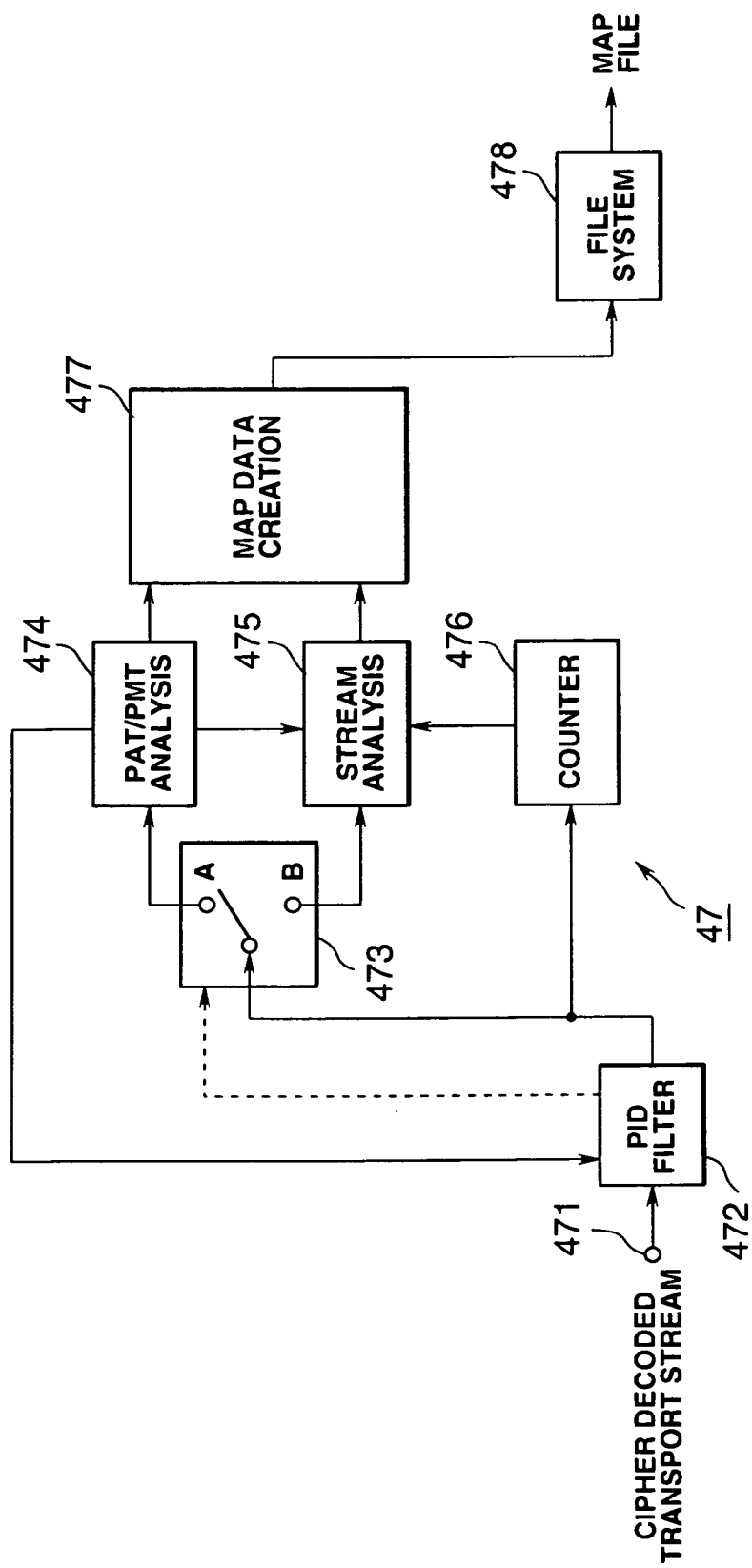
FIG. 4 is a block diagram showing an example of the specific configuration of a map file creation circuit of the encryption processing unit.

Here, the case in which contents data are MPEG2 transport stream will be explained with reference to the block diagram in FIG. 4 showing a specific example of configuration of the map file creating circuit 47.

This map file creating circuit 47 includes a PID filter 472 into which MPEG2 transport stream on which AV programs are multiplexed is inputted through a terminal 471, a PAT/PMT analysis unit 474 and a stream analysis unit 475 to which PID transport packets taken out of the PID filter 472 are supplied through a switch 473, a counter 476 to which PID transport packets taken out of the PID filter 472 are supplied, a map data creating unit 477 to which the results of analyses by the PAT/PMT analysis unit 474 and the stream analysis unit 475 are given, and a file system 478 connected to the map data creating unit 477.

The transport stream inputted through the terminal 471 is a stream made up of consecutive transport packets, and the transport packets are packeted MPEG2 video streams or MPEG1 audio streams.

The PID filter 472 takes out transport packets of specified PID from the inputted transport packets. The PID is a signal of 13-bit length located at the fixed position of the transport packet header, and shows the type of data stored in the payload (data portion following the transport packet header).

To begin with, the PID filter 472 takes out transport packets for a PAT (Program Association Table) of which PID=0x0000. The PAT transport packets outputted from the PID filter 472 are inputted into the PAT/PMT analyzing unit 474 through a switch 473.

Figure 5:
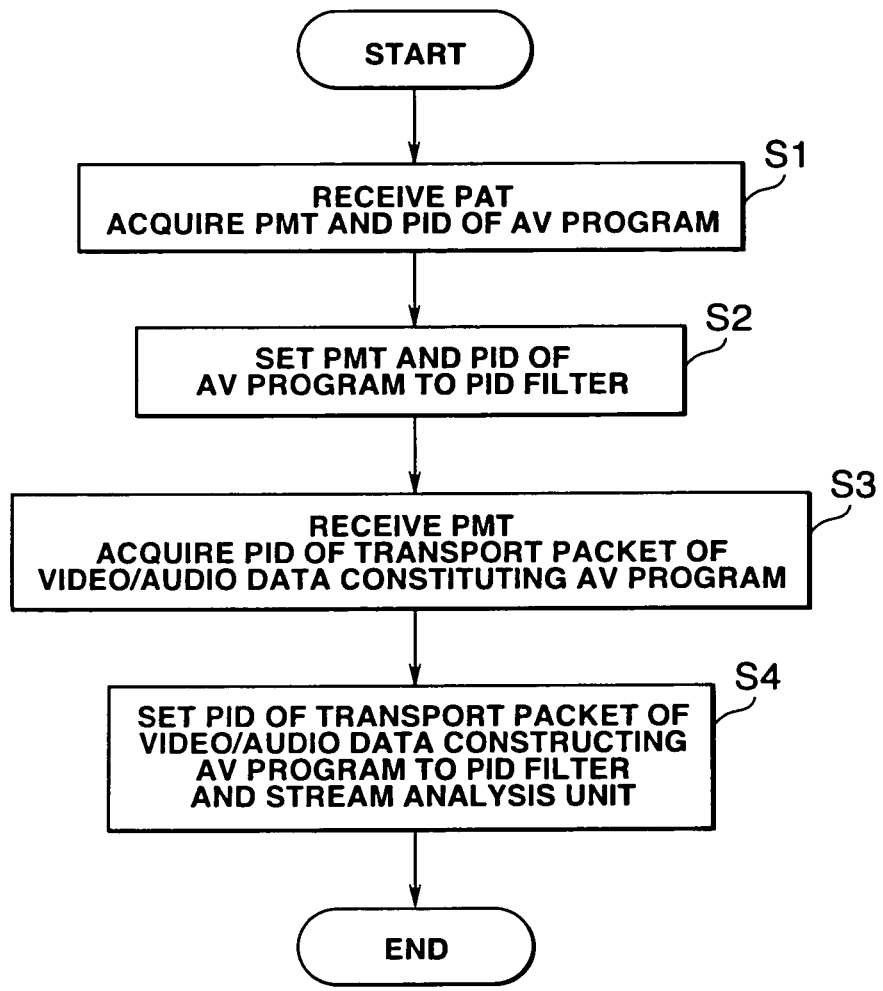
FIG. 5 is a flow chart showing the operating process of a PAT/PMT analyzing unit of the map file creation circuit.

Here, the operating process of the PAT/PMT analyzing unit 474 will be explained by referring to a flowchart shown in FIG. 5.

At step S1, the PAT/PMT analyzing unit 474 receives PAT transport packets. PAT contains the PID of transport packets of the PMT (Program Map Table) of AV programs multiplexed in the transport stream.

At step S2, the PAT/PMT analysis unit 474 sets the PID of the PMT of AV programs in the PID filter. After taking out transport packets carrying the PID of PMT, the PID filter 472 inputs them into the PAT/PMT analysis unit 474.

At step S3, the PAT/PMT analysis unit 474 receives transport packets of PMT. The PMT contains the PID of transport packets carrying a video stream or an audio stream constituting an AV program as their payloads. PAT/PMT analysis unit 474 acquires the PID of transport packets carrying video streams or audio streams constituting AV programs as their payloads.

At step S4, the PAT/PMT analysis unit 474 sets the PID of transport packets carrying a video stream or an audio stream constituting an AV program as their payloads in the PID filter and the stream analysis unit 475 to end the operating process.

And the PAT/PMT analysis unit 474 gives to the map data creating unit 477 the following parameters:
(A) The PID of transport packets of the PMT of an AV program,
(B) The PID of transport packets of video data constituting an AV program and the stream_type of the video data.
(C) The PID of transport packets of audio data constituting an AV program and the stream_type of the audio data.
(D) PCR_PID of the AV program.

Here, the steam_type means the contents of the PMT, and in the case of video data, it represents the stream-type of MPEG-2/MPEG-1 and in the case of audio data, it represents the stream-type of MPEG1/AC-3.

And the PID filter 472 takes out the video data transport packets and audio data transport packets specified by the PAT/PMT analysis unit 474 from the input transport stream, and inputs them into the stream analysis unit 475 through a switch 473. Transport packets other than the video data transport packets and audio data transport packets (such as service information packets) are not inputted into the stream analysis unit.

The transport packets outputted from the PID filter 472 are inputted into the counter 476. The counter 476 counts the number of bytes from the head packet of the transport stream to be recorded up to the current packet and gives the resulting value to the stream analysis unit 475.

Figure 6:
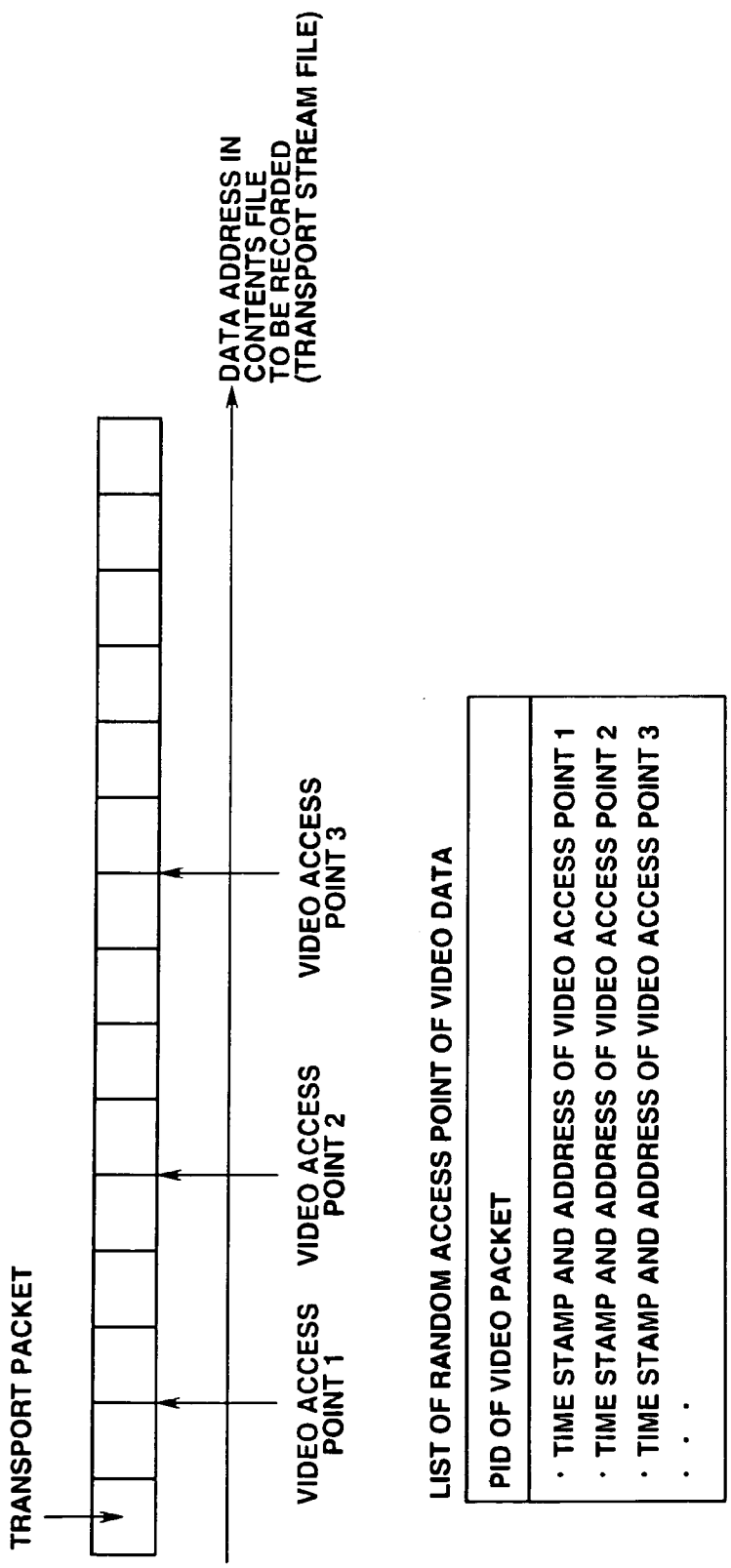
FIG. 6 is a conceptual rendering of a random access point list of video data in the MPEG system.

The stream analysis unit 475 extracts points that can be accessed at random among the AV program for reproduction. The transport packets at the random access points of video data are packets having the sequence header of MPEG video data and the successive I picture data as their payloads. A conceptual rendering of the list of random access points is shown in FIG. 6. The random access points show the time stamp of transport packets to be accessed at random and the addresses for starting data readout. Here, the time stamp is calculated based on the input time to the recording apparatus of transport packets at the random access points or the PTS (Presentation Time Stamp) of I pictures at the random access points. The PTS is information added to the header of PES packets according to the MPEG2 systems standard. Incidentally, this FIG. 6 shows transport stream files in a form of successive recording of transport packets. But a similar result can be achieved by adding time stamps showing the input time to the recording apparatus of the packet for each transport packet. This time stamp is similar to the 4-byte TSP_extra_header added to the transport packet prescribed by DV format for example.

The random access point information of video data and audio data is supplied to the map data creating unit 477. The map data creating unit 477 transforms the random access point information into tables.

The map data creating unit 477 gives the map data tables to the file system 478.

The file system 478 creates files out of the map data tables and outputs them.

Figure 7:
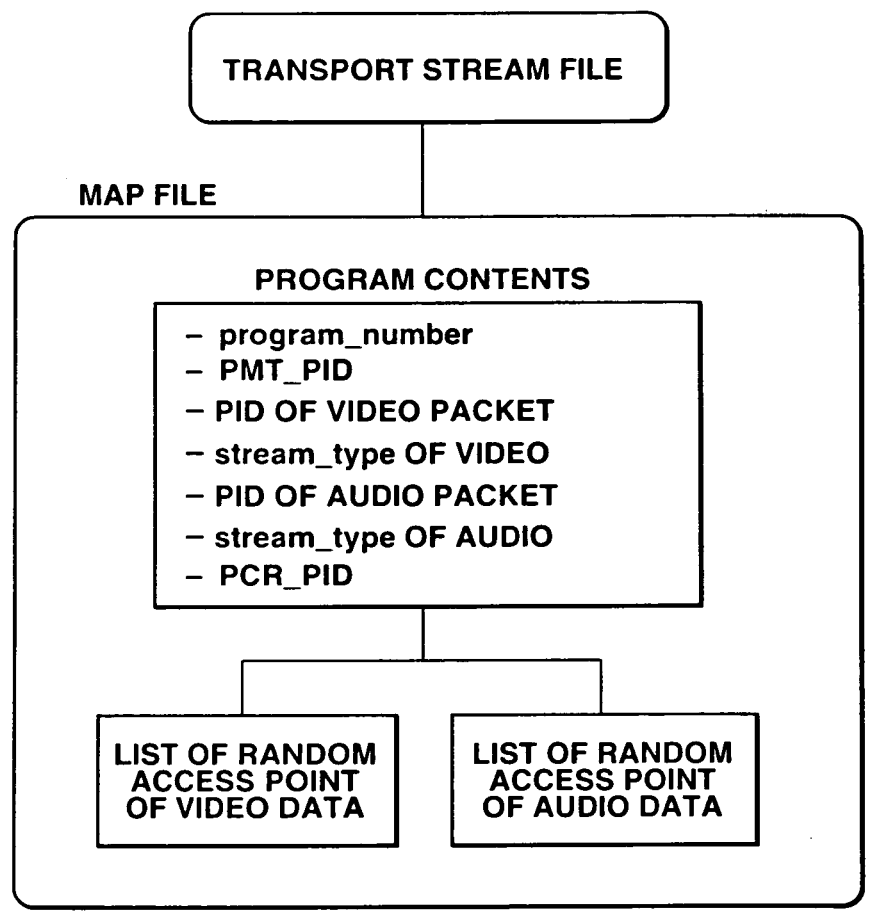
FIG. 7 is an explanatory schematic diagram of a transport stream and a map file.

FIG. 7 is an explanatory diagram of transport streams and map files. A map file contains the following data:

1. The PID of transport packets of the PMT of AV programs.
2. The PID of transport packets of video data constituting AV programs and the stream_type of video data.
3. The PID of transport packets of audio data constituting AV programs and the stream_type of audio data.
4. The PCR_PID of AV programs.
5. A list of random access points of AV video data.
6. A list of random access points of AV audio data.

Figure 8:
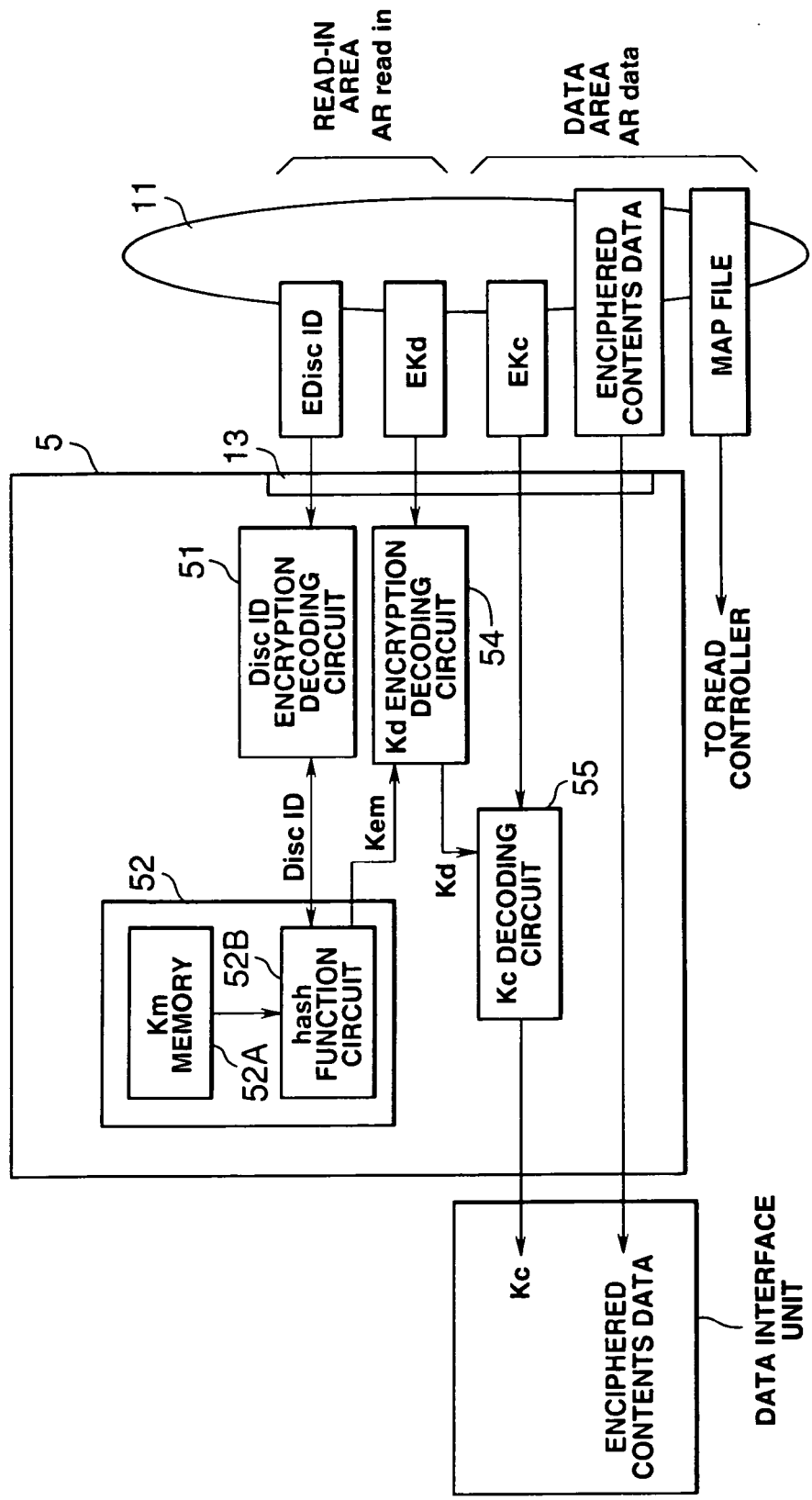
FIG. 8 is a block diagram showing an example of specific configuration of a decoding processing unit of the optical disc storing/reproducing apparatus.

The decoding processing unit 5 in the optical disc recording/reproducing apparatus 10, the specific configuration of which shown in FIG. 8, includes an EdiscId decoding circuit 51, a Kem generating module 52, a Kd decoding circuit 54 and a Kc decoding circuit 55.

The EDiscID decoding circuit 51 decodes EdiscID read by said recording/reproducing head 13 from the read-in-area AR read in of the optical disc based on the common security of the system that it has and creates medium identification information DiscID. This EdiscID creating circuit 51 gives the created medium identification information to the Kem generating module 52.

The Kem generating module 52 includes a Km memory 52A that stores a master key Km and a hash function circuit 52 that creates an effective master key Kem from the master key Km and the medium identification information DiscID. The hash function circuit 52B creates the combination of the master key Km and DiscID according to the formula (1), and applies the hash function thereto to create an effective master key Kem. And the hash function circuit 41B supplies the created effective master key Kem to the Kd decoding circuit 54. This Kem generating module 52 is configured in the same way as the Kem generating module 42, and both may be used for double purposes.

The EKd decoding circuit 54 decodes an enciphered disc key EKd read by the recording/reproducing head 13 from the read-in-area AR read in of the optical disc 11 by means of the effective master key Kem to produce a disc key Kd.

The EKc decoding circuit 55 decodes the deciphered contents keys EKc stored in the header of various sectors Si read out by the recording/reproducing head 13 from the data area AR data of the optical disc 11 by means of the disc key Kd to calculate a contents key Kc.

Meanwhile, the decoding processing unit 5 shown in FIG. 8 delivers contents data that have been read out while they remain ciphered and the decoded contents key Kc to the data interface. This is used for example when these contents are transmitted to other apparatuses.

Figure 9:
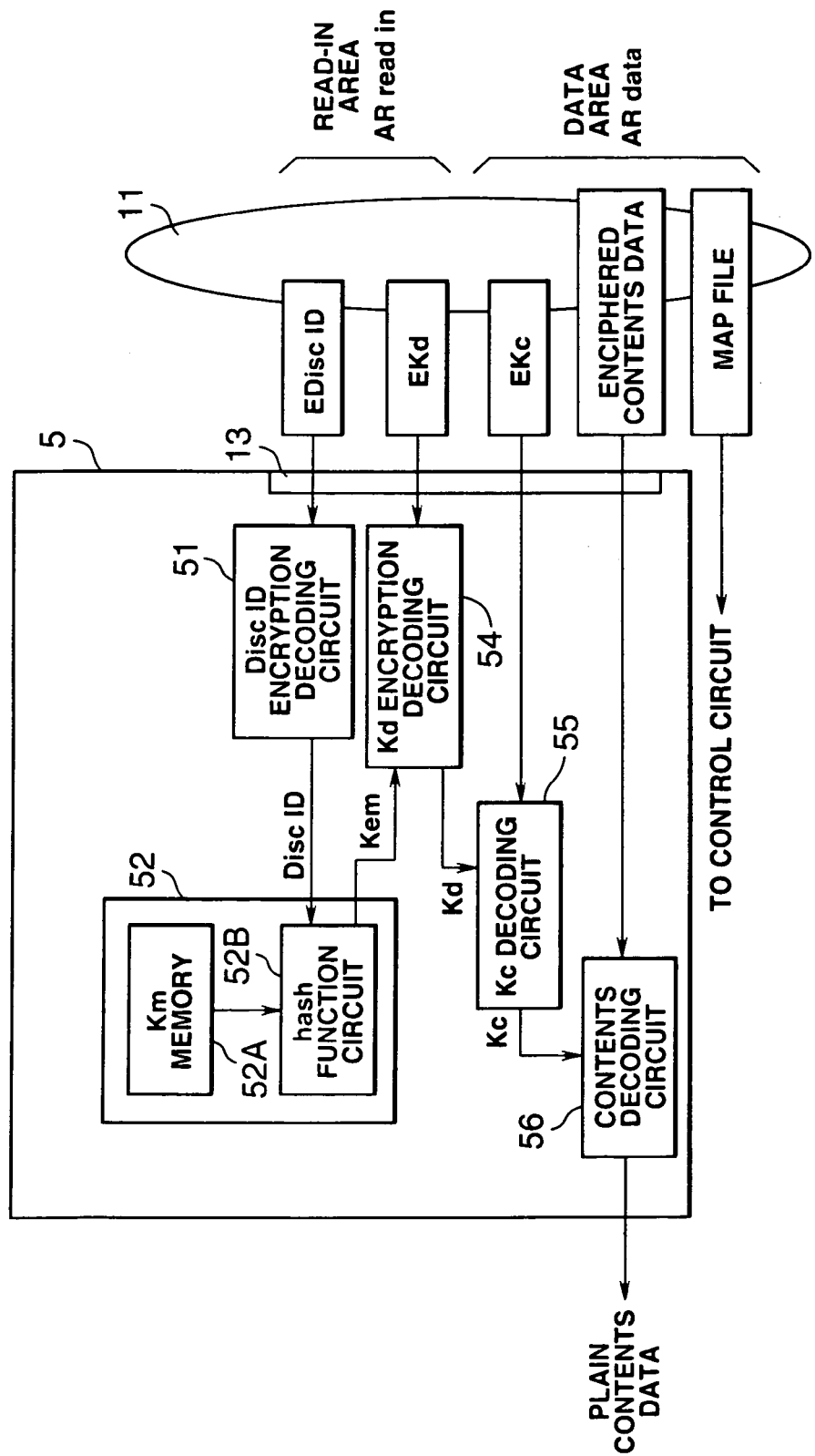
FIG. 9 is a block diagram showing an example of another configuration of the decoding processing unit.

On the other hand, the decoding processing unit 5 shown in FIG. 9 includes a contents decoding circuit 56 that decodes by means of a contents key Kc obtained by decoding by means of the EKc decoding circuit 55 the enciphered contents data read by the recording/reproducing head 13 from the data area AR data of the optical disc 11 to create clear text contents data.

The decoding processing unit 5 shown in this FIG. 9 is used for example in case where MPEG and other signals applied to these latter contents data in this reproducing apparatus are decoded and outputted as pictures through a D/A converter.

Incidentally, for starting this reproducing process, information contained in the map files created at the time of recording is used to control by means of the control circuit 17 the readout of contents data from the optical disc 11.

Figure 10:
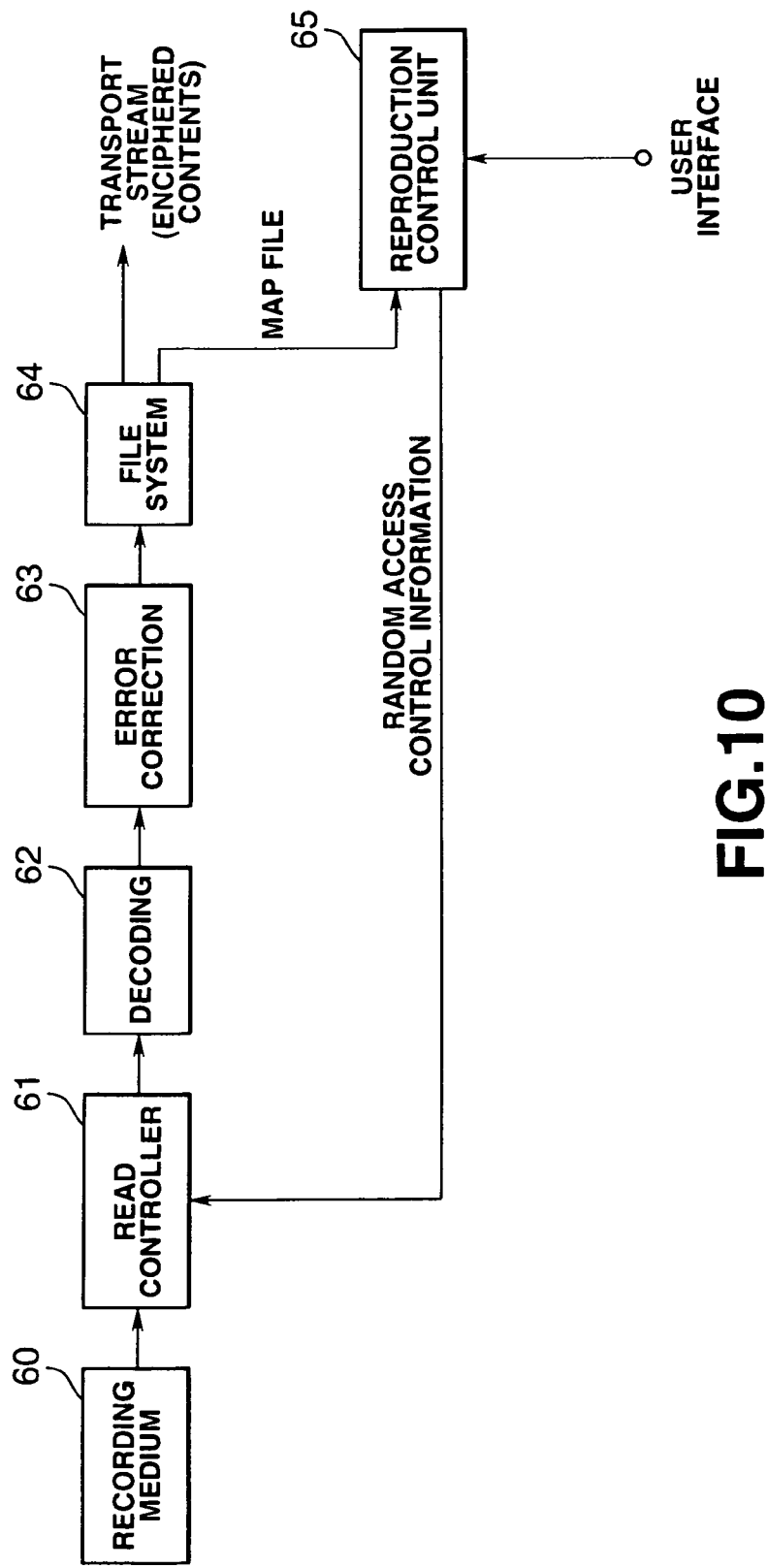
FIG. 10 is a block diagram showing the configuration of a contents data reproducing apparatus for controlling the readout of contents data by means of information contained in the map file.

FIG. 10 is a block diagram showing the contents data reproducing apparatus for controlling the readout of contents data by means of the information contained in map files. Here, a transport stream reproducing apparatus that uses information contained in the map files created in the map file creating circuit 47 described in FIG. 4 to control the readout of transport stream files corresponding to the map files will be explained.

A recording medium 60 contains transport stream files and their map files.

The reproduction control unit 65 instructs the read control unit 61 to read map files. The read control unit 61 reads map files from the recording medium 60. The map files are then processed at the decoding unit 62, the error correction unit 63 and the file system unit 64 to be inputted into the reproduction control unit 65.

The reproduction control unit 65 supplies the PID of PMT transport packets of AV programs, the PID of transport packets of video data constituting the programs, the stream_type of video data, the PID of transport packets of audio data constituting the programs, the stream_type of audio data and the PCR_PID to a demultiplexer and an AV decoder not shown.

When an instruction is given from the user interface to proceed to a random access reproduction, the reproduction control unit 65 determines the position of reading data from the recording medium 60 based on the contents of map data stored inside and inputs random access control information to the read control unit 61. When a program chosen by the user is to be reproduced from the middle at a certain time, for example, the reproduction control unit 65 finds out the nearest time stamp to the time specified from the list of time stamps, and instructs the read control unit 61 to read data from an I picture located at the address of transport stream corresponding to the time stamp. And when a program chosen by the user is to be reproduced at a high speed, the reproduction control unit 65 instructs the read control unit 61 to read successively I pictures contained in the program based on data found at the random access point corresponding to the program.

The read control unit 61 reads data from the random access point designated, and the data read and processed by the decoding unit 62, the error correction unit 63 and the file system unit 64 are outputted as transport stream.

And now the processing procedure at the encryption processing unit 4 when user data are to be recorded in the optical disc 11 will be explained by referring to the flowchart shown in FIG. 11. In this case, however, we assume that the medium identification information DiscID is written in the optical disc 11 at the time of the manufacture of the optical disc 11.

To begin with, at step S11, the DiscID encryption decoding circuit 41 receives an EDiscID or medium identification information DiscID that has been read from the read-in-area of the optical disc 11 and enciphered. At step S12, the DiscID encryption decoding circuit 41 further decodes the EdiscID based on the common security of the system that it has to create a DiscID and outputs the same to the hash function circuit 42B of the Kem generating module 42. The common security of the system was given by the copyright owner when a proper license was granted.

At step S13, the hash function circuit 42B of the Kem generating module 42 reads the master key Km from the Km memory 42A of the Kem generating module 42. And at step S14, the hash function circuit 42B of the Kem generating module 42 applies according to the formula (1) the hash function to the combination of medium identification information DiscID of the optical disc 11 and the master key Km to calculate an effective master key Kem and to supply the same to the Kd encryption decoding circuit 44.

Then at step S15, the Kd encryption decoding circuit 26 receives an enciphered disc key EKd read from the read-inarea of the optical disc 11. At step S16, the Kd encryption decoding circuit 26 determines whether an enciphered disc key EKd is written in the read-in-area of the optical disc 11 (whether it could receive an enciphered disc key EKd). When it is determined that no enciphered disc key EKd is written, the processing advances to step S17 and the random number generating circuit 43 generates a d-bit random number, specifically for example a 56-bit random number and outputs the same as a disc key Kd to the Kd encryption decoding circuit 44.

And at step S18, the Kd encryption decoding circuit 44 enciphers a disc key Kd supplied by the random number generating circuit 43 by means of an effective master key Kem that has been received from the hash function circuit 42B create an enciphered disc key EKd and stores the same in the read-in-area of the optical disc 11.

When it is determined at step S16 that an enciphered disc key EKd has been written, the processing advances to step S19, and the Kd encryption decoding circuit 44 decodes the enciphered disc key EKd that has been read from the read-in-area AR read in of the optical disc 11 by means of an effective master key Kem that has been received from the hash function circuit 42B to create a disc key Kd. The Kd encryption decoding circuit 44 outputs the disc key Kd to the Kc encryption circuit 45.

After processing at step S18 or S19, at step S20, the Kc encryption circuit 45 receives a contents key Kc and enciphered contents data from the interface unit, and at step S21 enciphers the contents key Kc by means of a disc key that has been received from the Kd encryption decoding circuit 44 (if an enciphered disc key EKd is recorded on the optical disc 11) or from the random number generating circuit 43 (if no enciphered disc key EKd is recorded on the optical disc 11) to create an enciphered contents key EKc. The Kc encryption circuit 45 also records the enciphered contents key EKc in the sector head that can be found in the data area of the optical disc 11.

Then at step S22, the contents data are recorded in the main data section of the data area of the optical disc 11.

At step S23, the contents data decoding circuit 46 decodes enciphered contents data by using a contents key Kc received from the interface to create clear text contents data, which will be delivered to the map file creating circuit 47.

At step S24, the map file creating circuit 47 (creates new map files if there is none) extracts information required for reproduction from clear text contents data to add the same to the map files.

Figure 12:
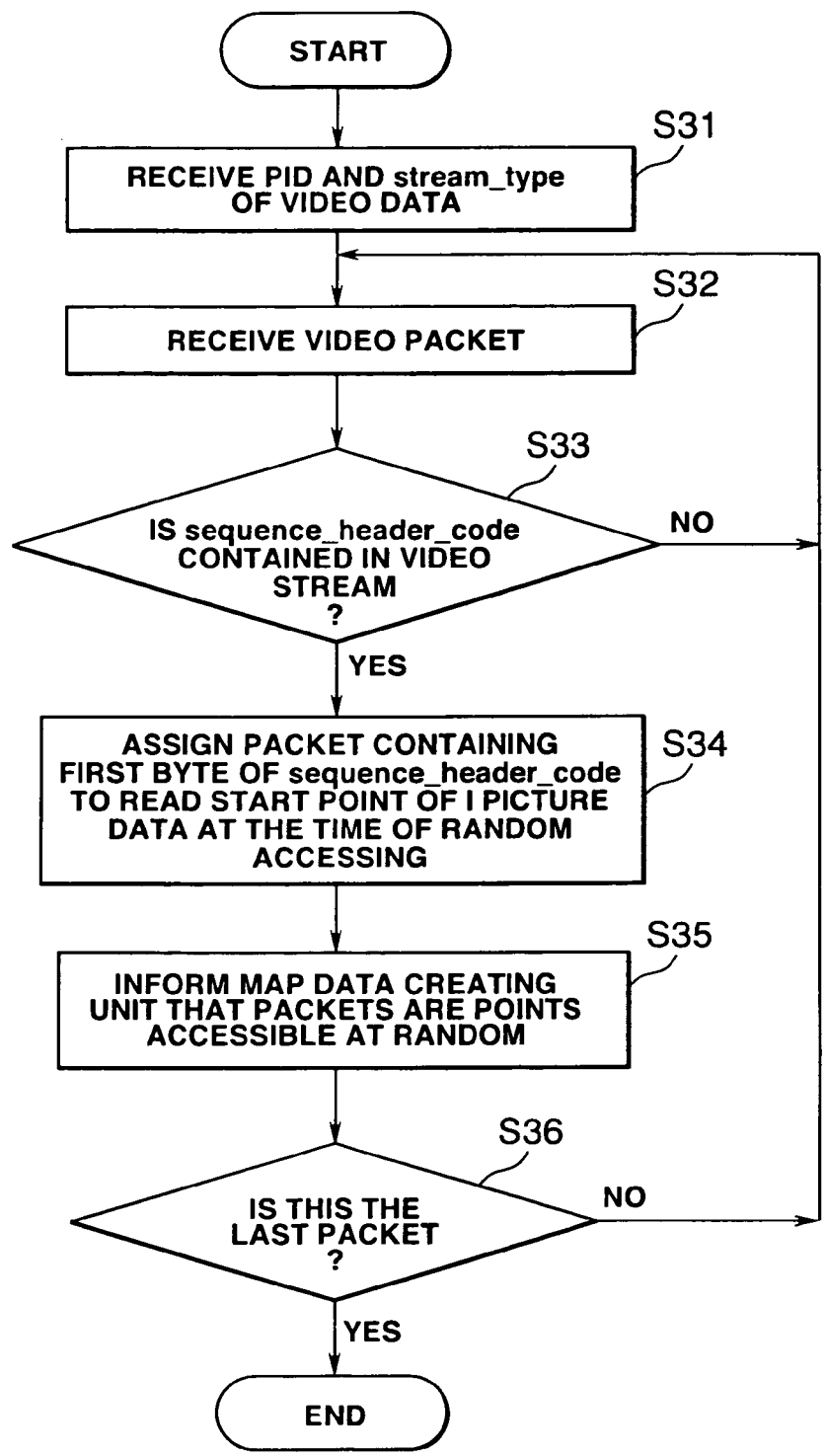
FIG. 12 is a flowchart showing the analysis process of the stream analysis unit of the map file creating circuit for analyzing video data transport packets.
Figure 13:
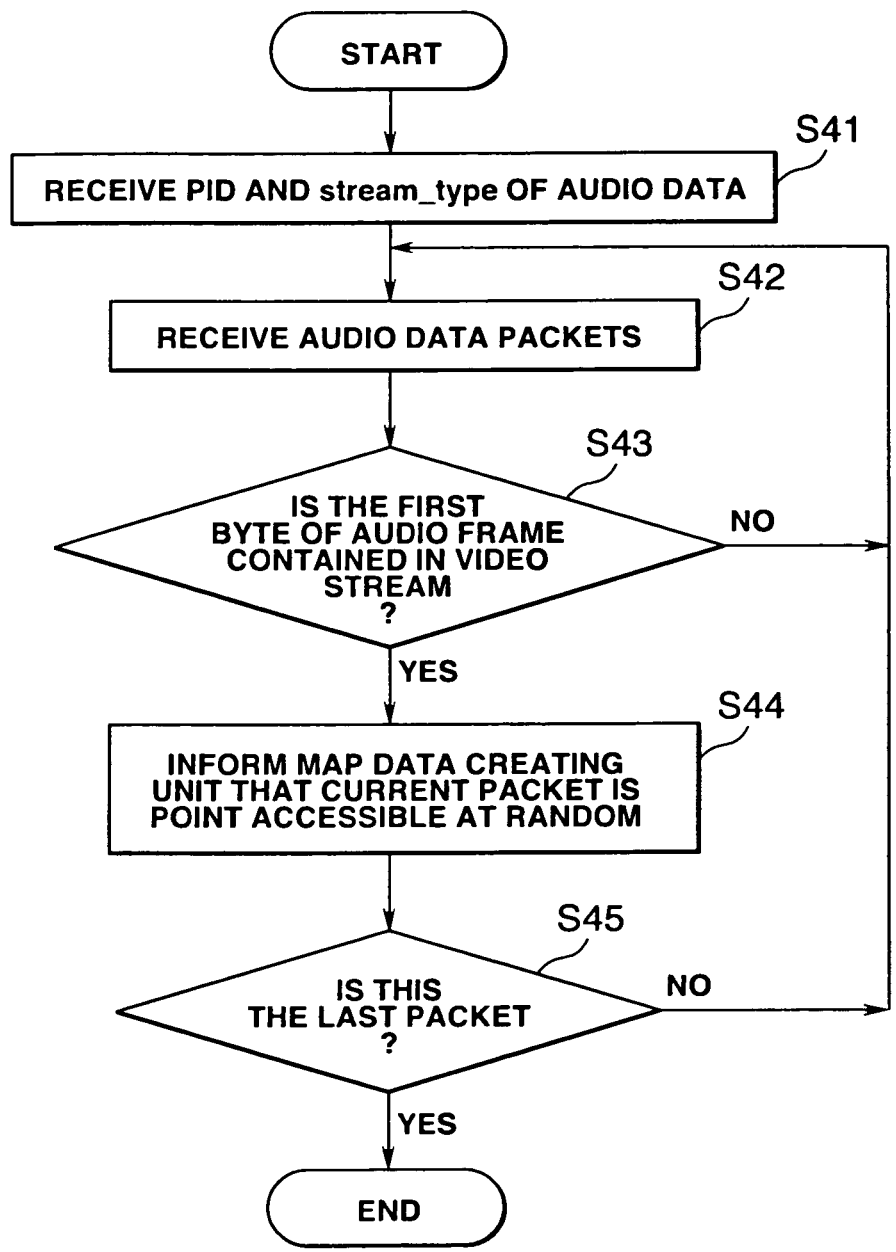
FIG. 13 is a flowchart showing the analysis process of the stream analysis unit for analyzing audio data transport packets.

Examples of operation of the stream analysis unit 475 of the map file creating circuit 47 will be explained by referring to the flowcharts shown in FIG. 12 and FIG. 13. FIG. 12 explains the analysis process of video data transport packets, while FIG. 13 explains the analysis process of audio data transport packets.

To begin with, the analysis process of video data transport packets will be explained by referring to a flowchart shown in FIG. 12.

At step S31, the PID of video data of AV programs to be recorded and their stream_type are inputted into the stream analysis unit 475 from the PAT/PMT analysis unit 404.

At step S32, the stream analysis unit 475 receives video data transport packets. The stream analysis unit 475 includes a video buffer. Upon receiving video data transport packets, the stream analysis unit 475 inputs the payload into the video stream buffer.

At step S33, the stream analysis unit 475 examines whether any stream contained in the video stream buffer contains any sequence_header_code of MPEG video data (32-bit signal of "0x000001B3"). Specifically, the question of whether there is anything matching with the sequence_header_code is examined by shifting by 1 byte from the stream head. Examined bytes is removed from the video stream buffer.

When at step S33 the stream contains no sequence_header_code, the processing returns to step S32. When step S32 is repeated twice or more, the video data packet payload is appended to the last data of the video buffer.

When at step S33 the stream contains any sequence_header_code, at step S34 transport packets containing the first byte of the sequence_header_code is made to be the starting point for reading I picture data for making random accesses.

At step S35, the stream analysis unit 475 informs the starting point for reading the packet to the map data creating unit 477. The number of bytes counting from the head of the transport stream to be recorded as the address of random access point to the packet is inputted into the map data creating unit 477 by the counter unit 476, and the PTS (Presentation Time Stamp) of I pictures included in the packet payload is inputted as the time stamp of the random access point.

At step S36, the stream analysis unit 475 determines whether the current packet is the last input packet. If it is not the last packet, the processing returns to step S32. If it is the last packet, the processing ends.

And now the analyzing process of audio data transport packets will be explained by referring to FIG. 13.

At step S41, the PID of audio data of programs to be recorded and their stream_data are inputted by the PAT/PMT analysis unit 474 into the stream analysis unit 475.

At step S42, the stream analysis unit 475 receives audio data transport packets.

At step S43, the stream analysis unit 475 examines whether its payload of audio data stream contains any sinc_byte as the first byte of audio frames. Since the audio frame is of a fixed length determined by the codifying bit rate, the question of whether sync_bytes appearing at this fixed interval are included in this payload is examined.

If the payload does not include sync_bytes of audio frames at step S43, the processing returns to step S42.

If the payload includes sync_bytes of audio frames at step S43, the processing advances to step S44.

At step S44, the stream analysis unit 475 informs the map data creating unit 477 that this is the starting point for reading audio frames in making random accesses to packets including sync_bytes of audio frames. The number of bytes counting from the head of the transport stream to be recorded as the address of random access point to the packet is inputted into the map data creating unit 477 by the counter unit 476, and the PTS (Presentation Time Stamp) of I pictures included in the packet payload is inputted as the time stamp of the random access point.

At step S45, the stream analysis unit 475 determines whether the current packet is the last input packet. If it is not the last packet, the processing returns to step S42. If it is the last packet, the processing ends.

Figure 11:
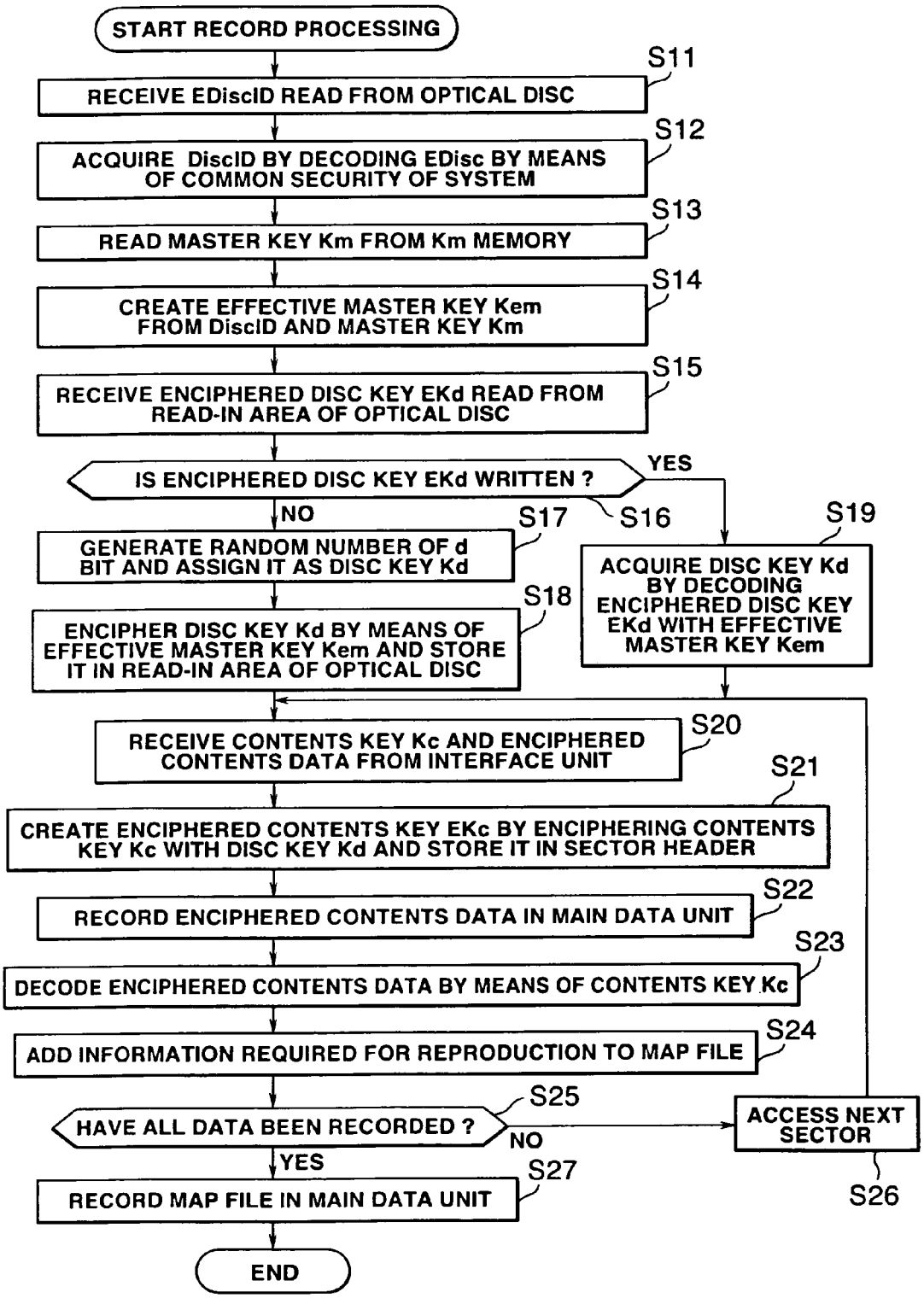
FIG. 11 is a flowchart showing the operating process of the encryption processing unit when user data are stored in an optical disc.

And at step S25 of the flowchart shown in FIG. 11, various circuits of the encryption processing unit 4 determine whether all the contents data are recorded or not. When it is determined that all the contents data are not yet recorded, the processing advances to step S26, and various circuits of the encryption processing unit access sectors that have not recorded the data of the optical disc 11, returns to step S20 to repeat the same processing. If it is determined at step S45 that all the contents data have been recorded, various circuits of the encryption processing unit 4 ends all the recording operation.

By decoding in this way enciphered DiscID by means of the specified common security of the system given when a proper license was granted from the copyright owner and by obtaining thus medium identification information DiscID, enciphered information is recorded in the recording medium.

Figure 14:
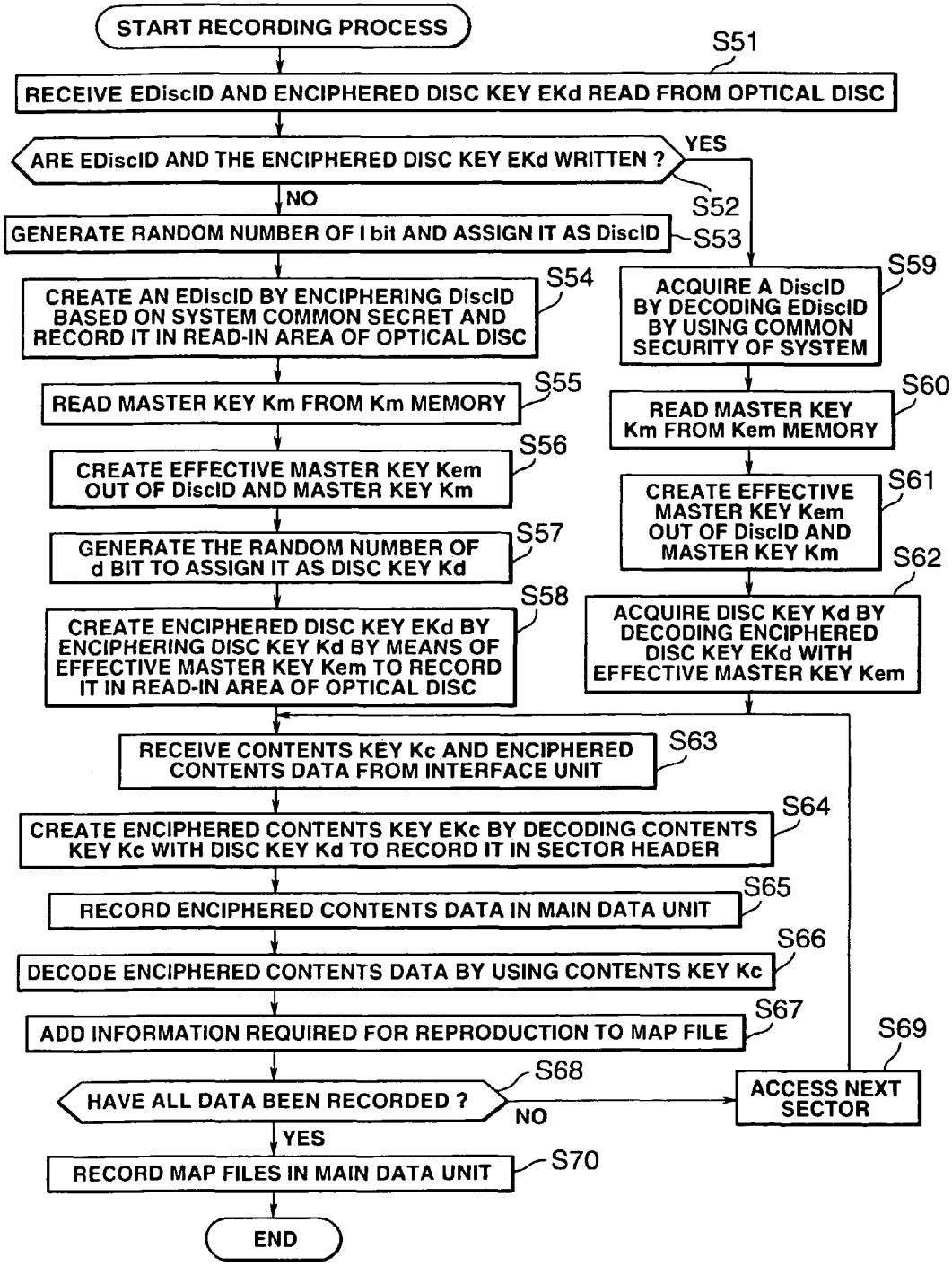
FIG. 14 is a flowchart showing the operating process of encryption processing unit when the user data is stored in an optical disc in which no media identification information DiscID is stored at the time of manufacturing.

And now, the operational process in the encryption processing unit 4 by which user data are recorded on an optical disc 11 on which no medium identification information DiscID was recorded at the time of manufacture will be explained by referring to the flowchart shown in FIG. 14.

To begin with, at step S51, the DiscID encryption decoding circuit 21 receives an EdiscID read from the read-in-area AR read in of the optical disc 11, and the Kd encryption decoding circuit 44 receives an enciphered disc key EKd read from the read-in-area AR read in of the optical disc 11.

Then at step S52, the DiscID encryption decoding circuit 41 determines whether an EdiscID is written in the read-in-area AR read in of the optical disc 11 (whether it was possible to receive EdiscID or not), and the Kd encryption decoding circuit 44 determines whether an enciphered disc key EKd has been written in the read-in-area AR read in of the optical disc 11 (whether it has been possible to receive the enciphered disc key EKd). When it is determined that neither EdiscID nor enciphered disc key EKd has been written, the processing advances to step S53, and the random number generating circuit 43 generates I-bit, specifically 128-bit random numbers, and outputs them as medium identification information DiscID to the DiscID encryption decoding circuit 41.

Then at step S54, the DiscID encryption decoding circuit 41 enciphers the medium identification information DiscID supplied by the random number generating circuit 43 by means of the common security of the system that it has, creates an EdiscID and records the same in the read-in-area AR read in of the optical disc 11.

Then at step S55, the hash function circuit 42B of the Kem generating module 42 reads the master key Km from the Km memory 42A of the Kem generating module 42. At step S56, according to the formula (1) above, the hash function circuit 42B of the Kem generating module 42 applies the hash function to the combination of the medium identification information DiscID of the optical disc 11 and the master key Km read from the Km memory 42A to create an effective master key Kem and supplies the same to the Kd encryption decoding circuit 44.

Then at step S57, the random generating circuit 43 generates d-bit or specifically 56-bit random numbers and output the same to the Kd encryption decoding circuit 44 as disc key Kd. At step S58, the Kd encryption decoding circuit 44 enciphers the disc key Kd received from the random generating circuit 43 by means of the effective master key Kem received from the hash function circuit 42B to create an enciphered disc key EKd and record the same in the read-in-area AR read in of the optical disc 11.

If it is determined at step S52 that the EdiscID and the enciphered disc key EKd are written, the processing advances to step S59, and the DiscID encryption decoding circuit 41 decodes the EdiscID read from this optical disc 11 by means of the common security of the system that it has to create a medium identification information DiscID.

At step S60, the hash function circuit 42B of the Kem generating module 42 reads the master key Km from the Km memory 42A of the Kem generating module 42. The hash function circuit 42B of the Kem generating module 42 at step S61, according to the formula (1) above, applies the hash function to the combination of the DiscID of the optical disc 11 and the master key Km to calculate the effective master key Kem, and supplies the same to the Kd encryption decoding circuit 44.

Then at step S62, the Kd encryption decoding circuit 44 decodes an enciphered disc key EKd read from this optical disc 11 by means of an effective master key Kem received from the hash function circuit 42B to obtain a disc key Kd. The Kd encryption decoding circuit 44 outputs the disc key Kd to the Kc encryption circuit 45.

After the processing described at step S58 or step S62, the processing advances to step S63, and the processing performed at step S63 through step S70 are similar to the processing performed at steps S20 through S27 shown in FIG. 11, and when it is determined that all the contents data have been recorded, all the recording operations end.

The medium identification information DiscID is created and recorded in recording media as described above, and contents data enciphered in response to the medium identification information DiscID created and the master key Km are recorded on the recording medium. For this reason, those who have not been granted a proper license from the copyright owner or license agents authorized by the copyright owner cannot reproduce contents data copied on existing recording media (recording media on which no DiscID is recorded) as meaningful information.

And now the reproducing process of user data performed by the decoding processing unit 5 will be explained by referring to the flowchart shown in FIG. 15. To begin with, at step S81, the EdiscID decoding circuit 51 receives enciphered medium identification information DiscID that has been read from the read-in-area AR read in of the optical disc 11 or EdiscID. Furthermore at step S82, the EdiscID decoding circuit 51 decodes the EdiscID based on the common security of the system that it has to create a medium identification information DiscID and outputs the same to the hash function circuit 52B of the Kem generating module 52.

Then at step S83, the hash function circuit 52B of the Kem generating module 52 receives a medium identification information DiscID outputted from the EdiscID decoding circuit 51, reads the master key Km from the Km memory 52A, applies the hash function to the combination of the medium identification information DiscID of the optical disc 11 and the master key Km according to the formula (1) to calculate an effective master key Kem, and supplies the same to the EKd decoding circuit 54.

At step S84, the EKd decoding circuit receives an enciphered disc key EKd read from the read-in-area AR read in of the optical disc 11. At step S85 the EKd decoding circuit 54 decodes this enciphered disc key EKd read by means of the effective master key Kem received from the hash function circuit 52B to calculate a disc key Kd and outputs the same to the Ekc decoding circuit 55.

Then, at step S86, the control circuit 17 reads map files from the optical disc 11 and uses the same to determine the position for reading contents data.

At step S87, the EKc decoding circuit 55 receives the enciphered contents keys EKc of various sectors that have been read from the data area AR data of the optical disc 11. At step S88 the EKc decoding circuit 55 decodes the enciphered contents keys EKc that have been read by means of the disc key Kd received from the EKd decoding circuit 54 to calculate contents keys Kc and delivers them to the interface unit at step S89.

At step S90, the contents decoding circuit 56 reads enciphered contents data from the data area AR data of the optical disc 11 and delivers them to the interface unit.

Then at step S91, the question of whether various circuits of the decoding unit 5 have read all the necessary contents data from the data area AR data of the optical disc 11. When it is determined that all the contents data have not yet been read, the process operation advances to step S92 where various circuits of the decoding unit 5 are supplied with the data of the following sectors that have not yet been read of the optical disc 11 and repeats step S86 and the subsequent steps. When it is determined that all the necessary contents data are read, various circuits of the decoding unit 5 end the whole reproducing process.

The explanation above relates to, as shown in FIG. 8, process operations that take place when contents data that have been read as they are enciphered and the decoded contents key Kc are to be delivered to the interface unit.

This is used in case where these contents are transmitted to other apparatuses.

On the other hand, an example of processing in the contents decoding circuit 56 in which enciphered contents data read by the recording/reproducing head 13 from the data area AR data of the optical disc 11 are decoded by means of a contents key Kc decoded by the EKc decoding circuit 55 to create clear contents data like the one in the decoding processing unit 5 shown in FIG. 9 will be explained by referring to the flowchart in FIG. 16.

This is used for example when MPEG and other signals applied to the latter contents are decoded in this reproducing apparatus to be outputted as pictures through a D/A converter.

Figure 15:
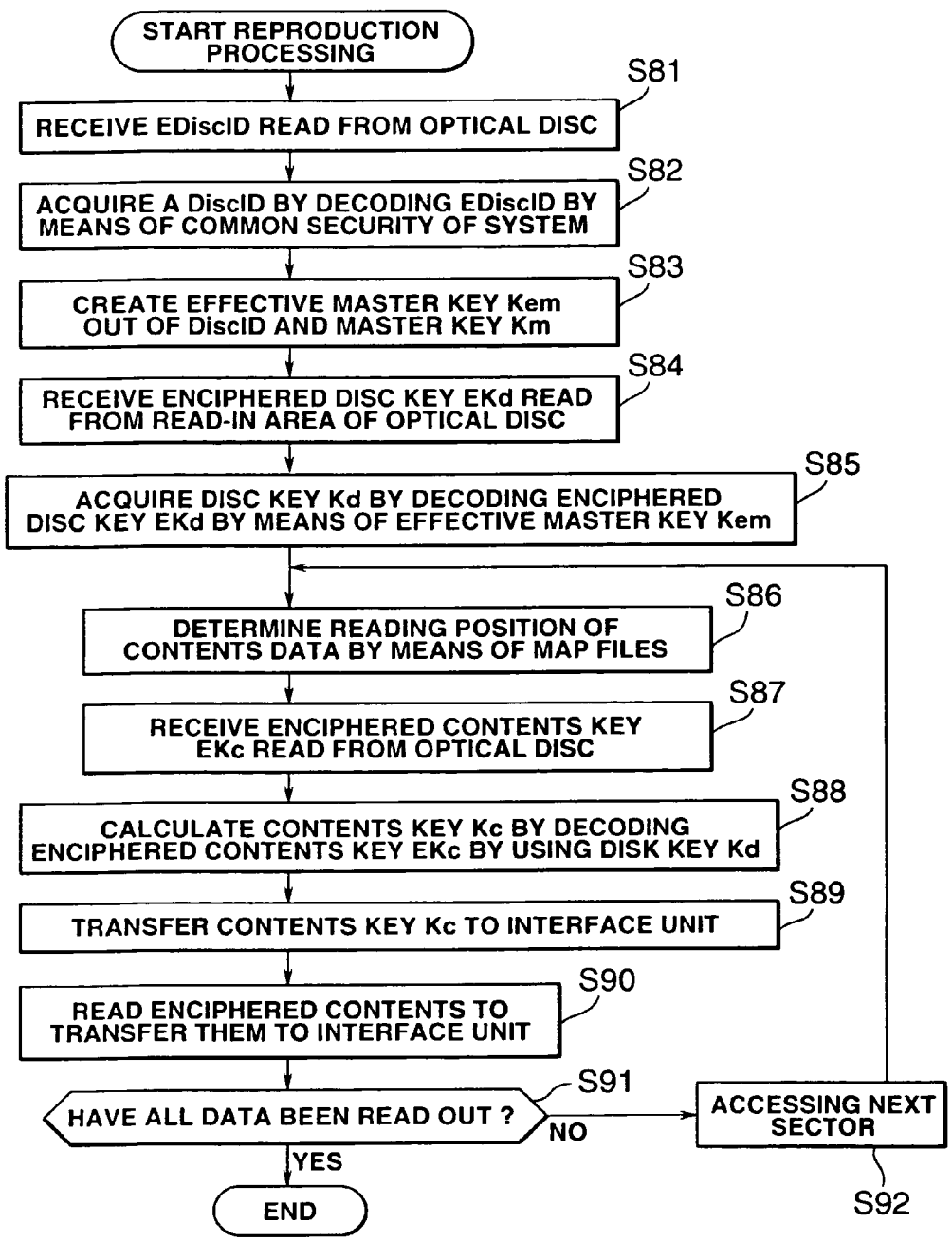
FIG. 15 is a flowchart showing the reproducing process of user data in the decoding processing unit.
Figure 16:
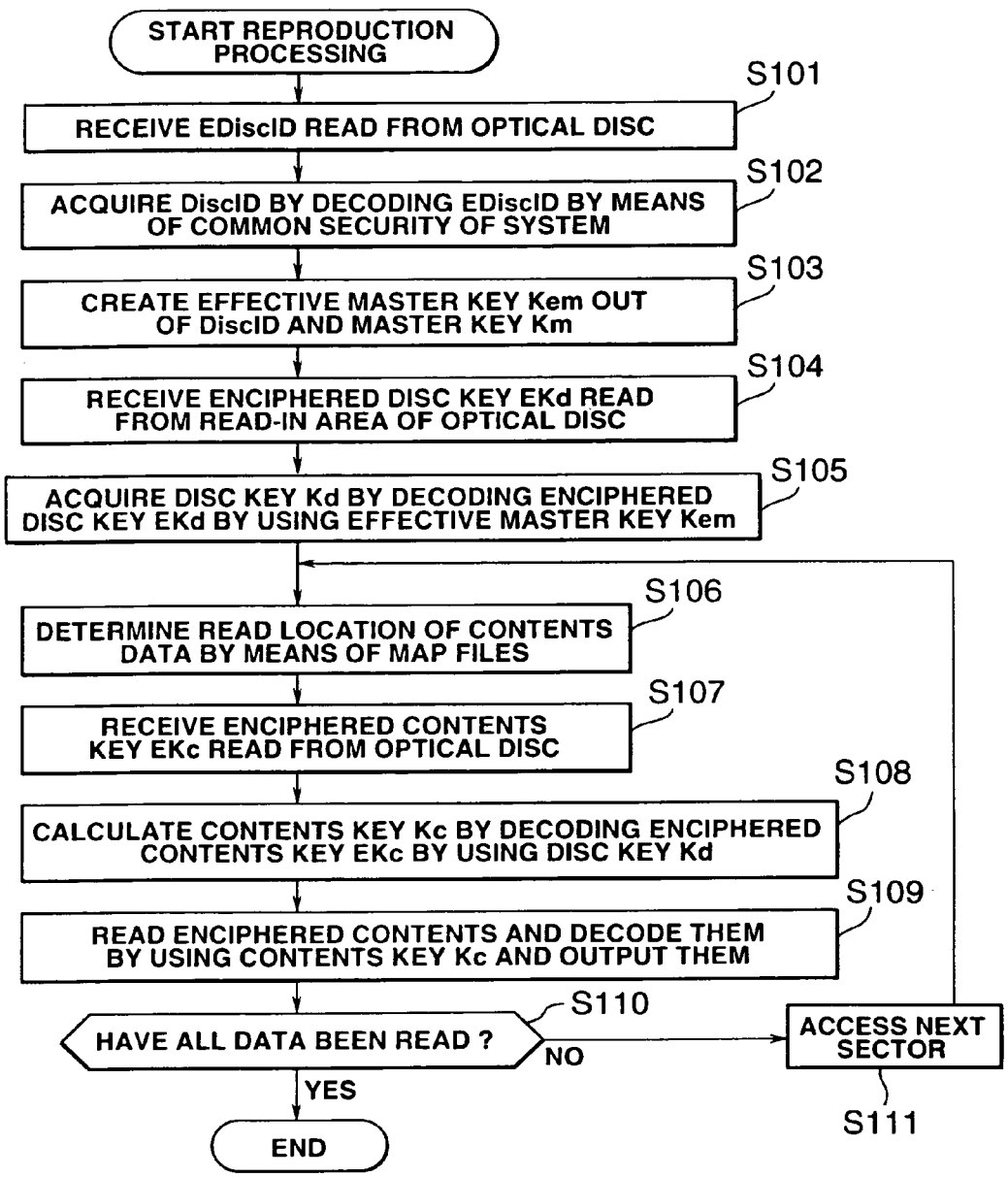
FIG. 16 is a flowchart showing the reproducing process of user data in the decoding processing unit.

Steps S101 through S108 in the flowchart shown in FIG. 16 are similar to the processing described at steps S81 through S88 in the flowchart shown in FIG. 15 and therefore their explanations will be omitted.

At step S109, the contents decoding circuit 56 decodes the enciphered contents data that have been read from the data area AR data of the optical disc 11 by means of a contents key Kc supplied by the EKc decoding circuit 55 to create clear text contents data and outputs the same for example to an MPEG decoder forming unit of this optical disc players.

At step S110, various circuits of the decoding unit 5 determine whether all the necessary contents data have been read from the data area AR data of the optical disc 11. When it is determined that all the contents data have not yet been read, the processing advances to step S111, where various circuits of the decoding unit 5 are supplied with data of the following sectors that have not been read of the optical disc 11 and repeats step S106 and the subsequent processing. When it is determined that all the necessary contents data have been read, various circuits of the decoding unit 5 end the whole reproduction processing.

By creating in this way the ID of recording media, enciphering them by means of the pre-set common security of the system and recording them on a recording medium, only those who are granted proper license from the copyright owner or a license manager authorized by the copyright owner are allowed to access the recording medium.

In the embodiment mentioned above, contents data and enciphered contents keys Ekc are recorded and reproduced by sector of an optical disc. However, this sector needs not always coincide with the physical sector of an optical disc and may be within previously fixed limits such as those formed by combining several physical sectors or logical sectors or limits set for each recording.

And in the mode of carrying out mentioned above, an enciphered contents key EKc is to be recorded in the header HD of each sector. However, instead of recording separately in each sector in this way, this may be bundled together and recorded in a lot for example in the read-in-area AR read in or the data area AR data. Incidentally, when enciphered contents keys EKc are recorded separately in each sector, they can produce a stronger enciphering effect.

And in the mode of carrying out mentioned above, one disc key Kd is used for each optical disc. On this point, there is no need that it be limited to one. It is possible to use one such disc key in a previously fixed block of an optical disc and to use one for each recording.

And in the mode of carrying out mentioned above, map files may be enciphered by means of a contents key or a disc key and may be recorded on an optical disc.

And in the mode of carrying out mentioned above, enciphered contents keys EKc obtained by enciphering contents keys Kc are recorded on an optical disc. However, information for creating contents keys Kc may be enciphered by means of a disc key Kd and the result may be recorded on a disc. For example, by applying the hash function to contents key creating information for creating contents keys Kc, contents keys Kc may be obtained.

And this invention can be applied to the case in which data are recorded or reproduced on recording media other than optical discs.

INDUSTRIAL APPLICABILITY

With the information recording apparatus, information reproducing apparatus, and information recording/reproducing apparatus as well as information recording method, information reproducing method and information recording/reproducing method according to the present invention, it is possible to record contents information on the recording medium and to finely control trick plays of such contents information.

And with the recording medium according to the present invention, it is possible to finely control trick plays of contents information recorded.

And with the information recording apparatus, information reproducing apparatus and information recording/reproducing apparatus as well as the information recording method, information reproducing method and information recording/reproducing method according to the present invention, it is possible to record contents information enciphered and transmitted as it is on the recording medium, to record on the recording medium information for enciphering contents information and still to finely control trick plays of such contents information.

And with the recording medium according to the present invention, enciphered contents information is recorded as it is and furthermore it is possible to finely control trick plays of contents information recorded.

The invention claimed is:

1. A computer readable non-transitory storage recording medium for use in a reproducing apparatus, said computer readable non-transitory storage recording medium being created by a recording apparatus having a map file creating circuit, said computer readable non-transitory storage medium having stored thereon:

enciphered contents data, wherein the contents data is recorded as a sequence of transport packets, a packet identifier (PID) is located at a fixed position on a transport packet header contained on the transport packets;

a PID filter output comprising transport packets of specified PID from the transport packets;

a map file including management information for reproduction, wherein the management information contained in the map file is associated with the enciphered contents data, the enciphered contents data being enciphered by means of a content key (Kc);

an identification key (Kd) created according to medium identification information allocated to the computer readable non-transitory storage recording medium; and processor readable instructions for locating recording medium access positions, for performing a calculating and decoding process involving the Kd to obtain a calculated content key (Kc), and for decoding the enciphered contents data by using the calculated content key (Kc), wherein the recording medium access positions are addresses on the computer readable non-transitory storage medium equal to time stamp addresses for the transport packets outputted from the PID filter, wherein a total number of the recording medium access positions is less than a total number of the transport packets outputted from the PID filter such that a respective recording medium access position is not provided for each transport packet outputted from the PID filter, and wherein the map file creating circuit includes the PID filter, a program association table/program map table (PAT/PMT) analysis unit and a stream analysis unit, in which the outputted transport packets from the PID filter are supplied to the PAT/PMT analysis unit and the outputted transport packets from the PID filter which pertain only to video data and/or audio data are supplied to the stream analysis unit, and in which the stream analysis unit obtains information pertaining to the recording medium access positions.

2. The computer readable non-transitory storage recording medium of claim 1, wherein the PAT/PMT analysis unit is configured to receive PAT transport packets, wherein PAT contains the PID of transport packets of the PMT of audio-video (AV) programs multiplexed in a transport stream.

3. The computer readable non-transitory storage recording medium of claim 1, wherein the PAT/PMT analysis unit is configured to set the PID of the PMT of audio-video (AV) programs in the PID filter.

4. The computer readable non-transitory storage recording medium of claim 1, wherein the PAT/PMT analysis unit is configured to receive transport packets of PMT.

5. The computer readable non-transitory storage recording medium of claim 1, wherein the PAT/PMT analysis unit is configured to set the PID of transport packets carrying a video stream or an audio stream constituting an audio-video (AV) program as their payloads in the PID filter and the stream analysis unit.

6. The computer readable non-transitory storage recording medium of claim 1, wherein the management information for reproduction includes a PID of transport packets of video data constituting audio-video (AV) programs and a stream_type of video data, a PID of transport packets of audio data constituting AV programs and a stream_type of audio data, a program clock reference (PCR)_PID of AV programs, a list of random access points of AV video data, and a list of random access points of AV audio data.

7. An apparatus comprising:
a computer readable non-transitory storage medium containing processor readable instructions; and a processor configured to cause a plurality of steps to be performed upon execution of the readable instructions from the computer readable non-transitory storage medium, said steps include inputting content information recorded as a sequence of transport packets, wherein a packet identifier (PID) is located at a fixed position on a transport packet header contained on the transport packets;

outputting, by a PID filter, transport packets of specified PID from the transport packets;

creating a map file, the map file including management information for reproduction, wherein the management information contained in the map file is associated with enciphered contents data, the enciphered contents data being enciphered by means of a content key (Kc);

creating an identification key (Kd) according to medium identification information allocated to a respective recording medium;

extracting access positions for the transport packets outputted from the PID filter;

creating management information including one or more access positions for the transport packets outputted from the PID filter, wherein the recording medium access positions are addresses on the respective recording medium equal to time stamp addresses for the transport packets outputted from the PID filter and wherein a total number of the recording medium access positions is less than a total number of the transport packets outputted from the PID filter such that a respective recording medium access position is not provided for each transport packet outputted from the PID filter; and writing the inputted content information and the management information on the respective medium, wherein the map file is created by a map file creating circuit which includes the PID filter, a program association table/program map table (PAT/PMT) analysis unit and a stream analysis unit, in which the outputted transport packets from the PID filter are supplied to the PAT/PMT analysis unit and the outputted transport packets from the PID filter which pertain only to video data and/or audio data are supplied to the stream analysis unit, and in which the stream analysis unit obtains information pertaining to the recording medium access positions.

8. The apparatus of claim 7, wherein the PAT/PMT analysis unit is configured to receive PAT transport packets, wherein PAT contains the PID of transport packets of the PMT of audio-video (AV) programs multiplexed in a transport stream.

9. The apparatus of claim 7, wherein the PAT/PMT analysis unit is configured to set the PID of the PMT of audio-video (AV) programs in the PID filter.

10. The apparatus of claim 7, wherein the PAT/PMT analysis unit is configured to receive transport packets of PMT.

11. The apparatus of claim 7, wherein the PAT/PMT analysis unit is configured to set the PID of transport packets carrying a video stream or an audio stream constituting an audio-video (AV) program as their payloads in the PID filter and the stream analysis unit.

12. A reproducing apparatus comprising:
management information reading means for reading, from a recording medium, management information and contents information recorded as a sequence of transport packets, the management information including one or more access positions for the content information, wherein a packet identifier (PID) is located at a fixed position on a transport packet header contained on the transport packets, a PID filter removes transport packets of specified PID from the transport packets, the access positions are addresses on the recording medium equal to a time stamp for the transport packets outputted from the PID filter, and a total number of the recording medium access positions is less than a total number of the transport packets outputted from the PID filter such that a respective recording medium access position is not provided for each transport packet outputted from the PID filter;

a reading control unit for reading a map file, the map file including management information for reproduction;

a reproduction control unit associating the management information contained in the map file with enciphered contents data, the enciphered contents data being enciphered by means of a content key (Kc);

a decoding processing unit creating an identification key (Kd) according to medium identification information allocated to a respective recording medium;

the decoding processing unit performing a calculating and decoding process involving the Kd to obtain a calculated content key (Kc), and deciphering the enciphered contents data by using the calculated content key (Kc); and reading position controlling means for reading the contents information from the respective recording medium based on the access positions, wherein the map file is created by a map file creating circuit which includes the PID filter, a program association table/program map table (PAT/PMT) analysis unit and a stream analysis unit, in which the outputted transport packets from the PID filter are supplied to the PAT/PMT analysis unit and the outputted transport packets from the PID filter which pertain only to video data and/or audio data are supplied to the stream analysis unit, and in which the stream analysis unit obtains information pertaining to the recording medium access positions.

13. The reproducing apparatus of claim 12, wherein the reading position controlling means for determining positions for reading contents information based on the map file.

14. The reproducing apparatus of claim 12, wherein the management information for reproduction includes a PID of transport packets of video data constituting audio-video (AV) programs and a stream_type of video data, a PID of transport packets of audio data constituting AV programs and a stream_type of audio data, a program clock reference (PCR)_PID of AV programs, a list of random access points of AV video data, and a list of random access points of AV audio data.

15. An apparatus comprising:
a computer readable non-transitory storage medium containing processor readable instructions; and
a processor configured to cause a plurality of steps to be performed upon execution of the readable instructions from the computer readable non-transitory storage medium, said steps include reading, from a recording medium, management information and contents information recorded as a sequence of transport packets, the management information including one or more access positions for the content information, wherein a packet identifier (PID) is located at a fixed position on a transport packet header contained on the transport packets, a PID filter removes transport packets of specified PID from the transport packets, the access positions are addresses on the recording medium equal to a time stamp address for the transport packets outputted from the PID filter, and a total number of the recording medium access positions is less than a total number of the transport packets outputted from the PID filter such that a respective recording medium access position is not provided for each transport packet outputted from the PID filter;

reading a map file, the map file including management information for reproduction, where the management information contained in the map file is associated with enciphered contents data, the enciphered contents data being enciphered by means of a content key (Kc);

creating an identification key (Kd) according to medium identification information allocated to a respective recording medium; and reading the contents information from the respective recording medium based on the access positions, wherein the map file is created by a map file creating circuit which includes the PID filter, a program association table/program map table (PAT/PMT) analysis unit and a stream analysis unit, in which the outputted transport packets from the PID filter are supplied to the PAT/PMT analysis unit and the outputted transport packets from the PID filter which pertain only to video data and/or audio data are supplied to the stream analysis unit, and in which the stream analysis unit obtains information pertaining to the recording medium access positions.

16. The apparatus of claim 15, wherein the information processor is configured to determine positions for reading contents information based on the map file.

* * * * *